US007648771B2

(12) United States Patent
Day et al.

(10) Patent No.: US 7,648,771 B2
(45) Date of Patent: Jan. 19, 2010

(54) THERMAL STABILIZATION AND PROCESSING BEHAVIOR OF BLOCK COPOLYMER COMPOSITIONS BY BLENDING, APPLICATIONS THEREOF, AND METHODS OF MAKING SAME

(75) Inventors: Bryon Paul Day, Canton, GA (US); Dennis John DeGroot, Appleton, WI (US); Michael Joseph Garvey, Appleton, WI (US); Gregory K. Hall, Menasha, WI (US); Peter Michalovich Kobylivker, Marietta, GA (US); Braulio Arturo Polanco, Canton, GA (US); Thomas Harold Roessler, Appleton, WI (US); Duane G. Uitenbroek, Little Chute, WI (US); Peiguang Zhou, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 57 days.

(21) Appl. No.: 10/749,681

(22) Filed: Dec. 31, 2003

(65) Prior Publication Data

US 2005/0148730 A1 Jul. 7, 2005

(51) Int. Cl.
*C08L 53/02* (2006.01)
(52) U.S. Cl. .......................... 428/523; 525/89
(58) Field of Classification Search .................. 525/89; 428/523
See application file for complete search history.

(56) References Cited

U.S. PATENT DOCUMENTS

| | | | |
|---|---|---|---|
| 2,544,069 A | 3/1951 | Cutler | |
| 3,338,992 A | 8/1967 | Kinney | |
| 3,341,394 A | 9/1967 | Kinney | |
| 3,542,615 A | 11/1970 | Dobo et al. | |
| 3,692,618 A | 9/1972 | Dorschner et al. | |
| 3,802,817 A | 4/1974 | Matsuki et al. | |
| 3,849,241 A | 11/1974 | Butin et al. | |
| 3,855,046 A | 12/1974 | Hansen et al. | |
| 4,041,203 A | 8/1977 | Brock et al. | |
| 4,100,324 A | 7/1978 | Anderson et al. | |
| 4,166,464 A | 9/1979 | Korpman | |
| 4,300,562 A | 11/1981 | Pieniak | |
| 4,333,782 A | 6/1982 | Pieniak | |
| 4,340,563 A | 7/1982 | Appel et al. | |
| 4,374,888 A | 2/1983 | Bornslaeger | |
| 4,395,215 A | 7/1983 | Bishop | |
| 4,450,026 A | 5/1984 | Pieniak et al. | |
| 4,573,991 A | 3/1986 | Pieniak et al. | |
| 4,641,381 A | 2/1987 | Heran et al. | |
| 4,652,487 A | 3/1987 | Morman | |
| 4,655,760 A | 4/1987 | Morman et al. | |
| 4,657,802 A | 4/1987 | Morman | |
| 4,663,220 A | 5/1987 | Wisneski et al. | |
| 4,704,116 A | 11/1987 | Enloe | |
| 4,710,189 A | 12/1987 | Lash | |
| 4,720,415 A | 1/1988 | Vander Wielen et al. | |
| 4,731,066 A | 3/1988 | Korpman | |
| 4,747,991 A | 5/1988 | Bishop | |
| 4,781,966 A | 11/1988 | Taylor | |
| 4,789,699 A | 12/1988 | Kieffer et al. | |
| 4,795,668 A | 1/1989 | Krueger et al. | |
| 4,798,603 A | 1/1989 | Meyer et al. | |
| 4,798,604 A | 1/1989 | Carter | |
| 4,818,464 A | 4/1989 | Lau | |
| 4,834,738 A | 5/1989 | Kielpikowski et al. | |
| 4,842,596 A | 6/1989 | Kielpikowski et al. | |
| 4,940,464 A | 7/1990 | Van Gompel et al. | |
| 4,965,122 A * | 10/1990 | Morman | 442/328 |
| 4,981,747 A | 1/1991 | Morman | |
| 5,057,368 A | 10/1991 | Largman et al. | |
| 5,069,970 A | 12/1991 | Largman et al. | |
| 5,108,820 A | 4/1992 | Kaneko et al. | |
| 5,145,727 A | 9/1992 | Potts et al. | |
| 5,151,092 A | 9/1992 | Buell et al. | |
| 5,169,706 A | 12/1992 | Collier, IV et al. | |
| 5,176,668 A | 1/1993 | Bernardin | |
| 5,176,672 A | 1/1993 | Bruemmer et al. | |
| 5,178,931 A | 1/1993 | Perkins et al. | |
| 5,188,885 A | 2/1993 | Timmons et al. | |

(Continued)

FOREIGN PATENT DOCUMENTS

EP           0 217 032           2/1992

(Continued)

OTHER PUBLICATIONS

NRL Report 4364, "Manufacture of Super-Fine Organic Fibers" by V. A. Wente, E. L. Boone and C. D. Fluharty, May 25, 1954.

(Continued)

*Primary Examiner*—Jeffrey C Mullis
(74) *Attorney, Agent, or Firm*—Dority & Manning, P.A.

(57) ABSTRACT

A blended composition of unsaturated block copolymer with improved thermal stability and processing behavior includes at least one unsaturated block copolymer; and a compatibilizer selected from the group consisting of (1) high melt flow rate homopolymers or copolymers; (2) styrene-ethylenepropylene-styrene (SEPS); (3) ethylene vinyl acetate (EVA); (4) styrene-butadiene-styrene (SBS), or styrene-isoprene-styrene (SIS) block copolymers; (5) single site catalyzed polyolefins, such as metallocene catalyzed and constrained geometry polyolefins; (6) amorphous poly alpha olefin homopolymer and copolymers; and (7) a combination of such.

17 Claims, 9 Drawing Sheets

U.S. PATENT DOCUMENTS

| | | | |
|---|---|---|---|
| 5,192,606 A | 3/1993 | Proxmire et al. | |
| 5,226,992 A | 7/1993 | Morman | |
| 5,277,976 A | 1/1994 | Hogle et al. | |
| 5,284,703 A | 2/1994 | Everhart | |
| 5,336,545 A | 8/1994 | Morman | |
| 5,336,552 A | 8/1994 | Strack et al. | |
| 5,350,624 A | 9/1994 | Georger et al. | |
| 5,358,783 A * | 10/1994 | Diehl et al. | 428/344 |
| 5,376,198 A | 12/1994 | Fahrenkrug et al. | |
| 5,382,400 A | 1/1995 | Pike et al. | |
| 5,385,775 A | 1/1995 | Wright | |
| 5,399,219 A | 3/1995 | Roessler et al. | |
| 5,444,121 A * | 8/1995 | Grennes et al. | 525/89 |
| 5,466,410 A | 11/1995 | Hills | |
| 5,486,166 A | 1/1996 | Bishop et al. | |
| 5,490,846 A | 2/1996 | Ellis et al. | |
| 5,509,915 A | 4/1996 | Hanson et al. | |
| 5,514,470 A | 5/1996 | Haffner et al. | |
| 5,540,796 A | 7/1996 | Fries | |
| H1583 H | 8/1996 | Hwo et al. | |
| 5,567,501 A | 10/1996 | Srinivasan et al. | |
| 5,595,618 A | 1/1997 | Fries et al. | |
| 5,601,547 A | 2/1997 | Kato et al. | |
| 5,628,097 A | 5/1997 | Benson et al. | |
| 5,665,186 A * | 9/1997 | Datta et al. | 156/66 |
| 5,669,897 A | 9/1997 | Lavon et al. | |
| 5,681,894 A * | 10/1997 | Williams et al. | 525/89 |
| 5,685,874 A | 11/1997 | Buell et al. | |
| 5,766,389 A | 6/1998 | Brandon et al. | |
| 5,804,021 A | 9/1998 | Abuto et al. | |
| 5,820,973 A | 10/1998 | Dodge, II et al. | |
| 5,851,935 A | 12/1998 | Srinivasan et al. | |
| 5,885,908 A * | 3/1999 | Jaeger et al. | 442/59 |
| 6,004,306 A | 12/1999 | Robles et al. | |
| 6,022,612 A | 2/2000 | Wilkie | |
| 6,025,071 A | 2/2000 | Cameron et al. | |
| 6,090,234 A | 7/2000 | Barone et al. | |
| 6,093,663 A | 7/2000 | Ouellette et al. | |
| 6,162,859 A | 12/2000 | Lu et al. | |
| 6,184,285 B1 | 2/2001 | Hatfield et al. | |
| 6,340,782 B1 | 1/2002 | Kling et al. | |
| 6,384,138 B1 | 5/2002 | Jacob et al. | |
| H2036 H | 7/2002 | Bush | |
| 6,452,063 B1 | 9/2002 | Curro et al. | |
| 6,454,747 B1 | 9/2002 | Shimada et al. | |
| 6,478,785 B1 | 11/2002 | Ashton et al. | |
| 6,497,949 B1 * | 12/2002 | Hyde et al. | 428/355 EN |
| 6,511,465 B1 | 1/2003 | Freiburger et al. | |
| 6,531,544 B1 * | 3/2003 | Vaughan et al. | 525/89 |
| 6,534,694 B2 | 3/2003 | Kling et al. | |
| 6,645,190 B1 | 11/2003 | Olson et al. | |
| 6,648,869 B1 * | 11/2003 | Gillies et al. | 604/385.28 |
| 6,677,258 B2 | 1/2004 | Carroll et al. | |
| 6,843,872 B2 | 1/2005 | Morman | |
| 6,982,231 B1 | 1/2006 | Uitenbroek et al. | |
| 7,087,289 B2 | 8/2006 | Soon et al. | |
| 2001/0008676 A1 | 7/2001 | Pelkie et al. | |
| 2002/0104608 A1 | 8/2002 | Welch et al. | |
| 2003/0125442 A1 * | 7/2003 | Maris et al. | 624/474 |
| 2003/0176546 A1 * | 9/2003 | Hoshi et al. | 524/323 |
| 2004/0147890 A1 | 7/2004 | Nakahata et al. | |
| 2004/0209042 A1 | 10/2004 | Peacock | |
| 2004/0236300 A1 | 11/2004 | Gibbs et al. | |
| 2005/0190326 A1 * | 9/2005 | Jeon et al. | 349/117 |
| 2005/0233153 A1 * | 10/2005 | Qin et al. | 428/423.1 |
| 2005/0239941 A1 * | 10/2005 | Miyamoto | 524/445 |
| 2006/0019045 A1 * | 1/2006 | Bourgeois | 428/35.7 |
| 2006/0036225 A1 | 2/2006 | Middlesworth et al. | |
| 2006/0100478 A1 * | 5/2006 | Connors et al. | 600/29 |

FOREIGN PATENT DOCUMENTS

| | | |
|---|---|---|
| EP | 0634453 A2 | 1/1995 |
| EP | 0650714 A1 | 5/1995 |
| EP | 0854174 A1 | 7/1998 |
| EP | 0 802 949 | 5/2003 |
| EP | 1333043 A1 | 8/2003 |
| FR | 2686887 | 8/1993 |
| GB | 2270915 | 3/1994 |
| JP | 56-090849 | 7/1981 |
| JP | 08-060121 | 3/1996 |
| WO | WO 95/00586 | 1/1995 |
| WO | WO 95/16425 | 6/1995 |
| WO | WO 00/37009 | 6/2000 |
| WO | WO 02/02321 | 1/2002 |
| WO | WO 02/22733 A2 | 3/2002 |
| WO | WO 2004/052940 | 6/2004 |

OTHER PUBLICATIONS

NRL Report 5265, "An Improved Device For The Formation of Super-Fine Thermoplastic Fibers" by K.D. Lawrence, R. T. Lukas, J. A. Young.

Standard Test: IST 70.4 (99), "Standard Test Method for Water Vapor Transmission Rate through Non Woven and Plastic Film Using a Guard Film and Vapor Pressure Sensor", 1999.

Patent Abstracts of Japan, JP 58029842, Feb. 22, 1983, Mitsubishi Petrochem Co Ltd.

Patent Abstracts of Japan, JP 04270746, Sep. 28, 1992, Tosoh Corp.

Patent Abstracts of Japan, JP 07070380, Mar. 14, 1995, Mitsui Petrochem Ind Ltd.

Patent Abstracts of Japan, JP 08324676, Dec. 10, 1996, Sumitomo Bakelite Co Ltd.

Patent Abstracts of Japan, JP 11106565, Apr. 20, 1999, Shibasaki Seisakusho:KK.

Patent Abstracts of Japan, JP 2000239527, Sep. 5, 2000, Nippon Mitsubishi Oil Corp.

* cited by examiner

THERMAL STABILIZATION AND PROCESSING BEHAVIOR OF BLOCK COPOLYMER COMPOSITIONS BY BLENDING, APPLICATIONS THEREOF, AND METHODS OF MAKING SAME

FIELD OF THE INVENTION

The present invention relates to methods for blending styrenic block copolymer compositions, manufacturing methods for making film and filament based materials from such styrenic block copolymer compositions, and disposable product applications of such film and filament based materials.

BACKGROUND OF THE INVENTION

Unsaturated styrenic block copolymers such as styrene-butadiene-styrene (SBS) and styrene-isoprene-styrene (SIS) are often difficult to use in extrusion equipment as a result of thermal degradation of the copolymers during the extrusion processes. The term "unsaturated" refers to the midblock portion of the block copolymer. While SIS materials may have less difficulty than SBS materials, the SIS copolymers often lose molecular weight during extrusion, thereby leading to loss in "tension" performance in produced filaments or films.

Such block copolymers are available from numerous polymer suppliers, such as from Kraton Polymers U.S. LLC of Houston, Tex. and Septon Company of America, Pasadena, Tex. Other suppliers of such polymers include Dexco Polymers of Houston, Tex. and Dynasol of Spain. These polymers offer the potential advantages of elasticity at a relatively low cost, and at significantly lower cost than saturated styrenic block copolymers (i.e. hydrogenated midblock portions), which are currently suggested for use to impart elasticity in personal care product applications.

While such unsaturated polymers have frequently been used in adhesive-type applications, and in some instances, film applications based on solution formation, as well as for injection molding applications, such polymers have heretofore posed a manufacturing challenge in the film and filament extrusion/manufacturing setting. In particular, the unsaturated styrenic block copolymers SBS and SIS include a midblock which is unsaturated. As a result, these resin types change with processing temperature changes and lengthy dwell times in extrusion systems, such as cast or blown film systems, or filament extrusion systems. SBS tends to crosslink (increasing in viscosity and modulus) while SIS chain scissions (tending at times to lower in viscosity). SBS may even form a gel-like material during such extrusion processes. In any event, the stability of such materials over the extended period of time required to extrude film and filaments heretofore has not been predictable. Such materials may clog the die heads or the channels delivering the polymer to the die heads, resulting in a complete shut down of a manufacturing line. Since the extrusion processes for film and filament-based material may occur over a period of as long as 30-60 minutes and under temperature conditions of up to 450° F. (230° C.), the processing demands on such polymers are significant. It should be noted that while actual extrusion of polymers occurs rather quickly, the 30 to 60 minute time window describes the manufacturing process from start to finish, taking into account the polymer's travel through hoppers, melt pumps, channels, dies and also including the inevitable "down time", where processing has to be halted for a time for some reason. Essentially, if the polymer resin has time to sit idle in the processing channels, severe manufacturing disturbances could occur.

It has been determined that even with the addition of polymer stabilizers, such as those available from Ciba Specialty Chemicals of New Jersey, under the designations IRGAFOX 168, IRGANOX 1010, 1076, and ULTRANOX 626, and SUMILIZER GS from Sumitomo, little improvement can be provided to address these processing issues. While such stabilizer packages may extend the stability extrusion time a few minutes, they do so at much additional processing cost, thereby adding significant costs to the end product. The narrow processing temperature window required for these polymers has therefore limited their practical usage in consumer product applications.

As can be seen in FIGS. 1 and 2, which illustrate the effects of various stabilizers on such polymers during extrusion, including a comparison to easily processed saturated stryenic block copolymers without stabilizers (KRATON G 1730), unsaturated styrenic block copolymers demonstrate processing challenges, even with the addition of such stabilizers. Such materials were extruded as films, and then evaluated in a time sweep test method as described below. As can be seen in FIG. 1, a saturated styrenic block copolymer 2, retains its viscosity at a fairly constant level in an extrusion system over a lengthy period of time, even without use of a stabilizer. However, the addition of various stabilizers 3, 4, 5, and 6 to KRATON D1402 SBS (#4 which was 1250 parts per million (ppm) of IRGANOX 1010 along with 2500 ppm IRGAFOX 168, #6 which was mineral oil (between 5-10 percent), #3 which was 750 ppm of IRGANOX 1010 along with 1500 ppm of IRGAFOX 168, #5 which was 1000 ppm SUMILIZER GS) fail to control viscosity levels over the same time period.

It can be seen in FIG. 2, that some stabilizers 7, 8, 9, 10 do have more of a leveling impact on KRATON DRP 6430 SIS materials over time, as such materials retain a more predictable viscosity level, and one that is consistent with a saturated styrenic block copolymer (KRATON G1730) 2. In FIG. 2, the stabilizers included 1250 ppm IRGANOX 1010 and 2500 ppm of IRGAFOX 168 (8), 1000 ppm of IRGANOX 1010 and 2000 ppm of IRGAFOX 168 (7), no stabilizer (9), and 750 ppm IRGANOX 1010 and 1500 ppm of IRGAFOX 168 (10). However, it has been found that even with such stabilizers, SIS materials do not always demonstrate sufficient elastic properties by themselves, that are desirable in personal care product applications. For instance, SIS materials tend to lose molecular weight/tension as they are being processed. Therefore more of the material has to be utilized to maintain tensions at acceptable levels in final product. Also, as can be seen, as a result of loss in molecular weight, the viscosity of such materials may lower over time.

As such polymers either cross-link or chain scission, the viscosity of the polymers during the extrusion melt fluctuates with only minor temperature variation. It is therefore difficult to maintain a relatively constant viscosity of such polymers in an extrusion process so as to produce a film or filament having uniform properties throughout. For instance, even if the polymer could successfully pass through the manufacturing system, slight variations in film production (casting) temperatures could cause film edges to tear, film hole formation and general structural unevenness. Therefore, manufacturing difficulties have effectively made use of such polymers for various consumer product applications impractical.

There is therefore a need for acceptable polymer compositions that utilize unsaturated block copolymers. There is also a need for methods of processing such polymers that avoid unwanted chemical reactions during processing, making use of such polymers more practical. There is also a need for methods for processing such polymers into film and filament/fiber applications, in which relatively uniform viscosity is maintained over a broader range of processing temperatures and longer dwell times (that is the time it takes for the polymer to pass through the entire extrusion system, even with manufacturing delays). There is likewise a need for films and filaments made by such compositions rather than films and filaments made from more costly saturated styrenic block copolymers. There is also need for film and filament/fiber materials made from such compositions that offer acceptable elastic performance for use in a variety of personal care product applications. Finally, there is a need for unsaturated block copolymer compositions that are capable of being combined with other lower cost polymers, such that overall manufacturing costs may be reduced, without compromising product quality or performance. It is to such needs that the present invention is directed.

SUMMARY OF THE INVENTION

A blended composition of unsaturated block copolymer includes at least one unsaturated block copolymer; and a compatibilizer selected from the group consisting of (1) high melt flow rate homopolymers or copolymers; (2) styrene-ethylenepropylene-styrene (SEPS) block copolymer; (3) ethylene vinyl acetate (EVA); (4) styrene-butadiene-styrene (SBS) block copolymer, or styrene-isoprene-styrene (SIS) block copolymers; (5) single site catalyzed polyolefins, such as metallocene catalyzed and constrained geometry polyolefins; (6) amorphous poly alpha olefin homopolymer and copolymers; and (7) a combination of such.

In an alternative embodiment of the composition, the blended composition includes an unsaturated block copolymer that is a styrene-isoprene-styrene block copolymer. In a further alternative embodiment of the composition, the compatibilizer is a high melt flow rate polymer having a melt flow rate of at least about 20 g/10 min. In still a further alternative embodiment of the composition, the compatibilizer is a high melt flow rate polymer having a melt flow rate of at least about 30 g/10 min. In still a further alternative embodiment of the blended composition, the compatibilizer is a high melt flow rate polymer having a melt flow rate of at least about 40 g/10 min. In still a further alternative embodiment of the composition, the compatibilizer is a high melt flow rate polymer having a melt flow rate between about 10 g/10 min and 50 g/10 min, alternatively, between about 20 and 50 g/10 min. In yet another alternative embodiment of the composition, the unsaturated block copolymer is a styrene-isoprene-styrene block copolymer and said compatibilizer is a styrene-butadiene-styrene block copolymer. In yet another alternative embodiment of the blended composition, the styrene-isoprene-styrene and styrene-butadiene-styrene block copolymers are present in said blended composition in a ratio of about 2:1. In yet another alternative embodiment of the composition, the blended unsaturated block copolymer includes a polyolefinic polymer. In still another alternative embodiment of the composition, the blended block copolymer and compatibilizer are present with the polyolefinic polymer in a ratio from about 20:80 to about 40:60 SIS/SBS blend to polyolefinic polymer. Alternatively, this ratio may be 30:70. In yet another alternative embodiment of the composition, the blended block copolymer and compatibilizer are present with the polyolefinic polymer in a ratio from about 95:5 to about 80:20. In yet another alternative embodiment of the composition, the compatibilizer is a styrenic block copolymer having a high melt flow rate and a styrene content by weight, of at least ten percent. In yet another alternative embodiment of the composition, the compatibilizer is a styrenic block copolymer having a high melt flow rate and a styrene content by weight of at least twenty percent. In still another alternative embodiment of the composition, the compatibilizer is a styrenic block copolymer having a high melt flow rate and a styrene content by weight of at least thirty percent. In yet another alternative embodiment of the composition, the compatibilizer is a styrenic block copolymer having a high melt flow rate and a styrene content by weight of at least forty percent.

A method for producing an elastic film or filament from a blended unsaturated styrenic block copolymer composition includes the steps of blending either a styrene-isoprene-styrene (SIS) block copolymer or styrene-butadiene-styrene (SBS) block copolymer with a compatibilizer selected from the group consisting of (1) high melt flow rate homopolymers or copolymers; (2) styrene-ethylenepropylene-styrene (SEPS) block copolymer; (3) ethylene vinyl acetate (EVA); (4) SBS, or SIS block copolymers; (5) single site catalyzed polyolefins, such as metallocene catalyzed and constrained geometry polyolefins; (6) amorphous poly alpha olefin homopolymer and copolymers; and (7) a combination of such; and extruding such blended polymer composition into either an elastic film or series of filaments. In an alternative embodiment of the method, the elastic film or filaments is bonded to at least one nonwoven web material. In yet another alternative embodiment of the method, the previously described bonding step is accomplished by ultrasonic bonding. In still another alternative embodiment of the above method, the elastic film or filaments is bonded to two nonwoven web materials (one on each side of the film or filaments). In yet another alternative embodiment of the above method, the bonded nonwoven material(s) is necked. In yet another alternative embodiment of the above method, at least one nonwoven material is bonded to the film or filaments while the film or filaments are in a stretched condition (under tension). In yet another alternative embodiment of the above method, the blend is comprised of styrene-isoprene-styrene block copolymer with styrene-butadiene-styrene block copolymer in a ratio of about 2:1 weight percent of styrene-isoprene-styrene block copolymer to styrene-butadiene-styrene block copolymer.

A method for producing an elastic film or filament laminate from an unsaturated styrenic block copolymer blended composition includes the steps of providing a film or series of filaments, or alternatively extruding a film or series of filaments from a blend of either a styrene-isoprene-styrene or styrene-butadiene-styrene block copolymer with a compatibilizer selected from the group consisting of (1) high melt flow rate homopolymers or copolymers; (2) styrene-ethylenepropylene-styrene (SEPS) block copolymer; (3) ethylene vinyl acetate (EVA); (4) SBS, or SIS block copolymers; (5) single site catalyzed polyolefins, such as metallocene catalyzed and constrained geometry polyolefins; (6) amorphous poly alpha olefin homopolymer and copolymers; and (7) a combination of such; and laminating the film or filaments to at least one sheet material. In an alternative embodiment of the above method, the blend is comprised of styrene-isoprene-styrene block copolymer with styrene-butadiene-styrene block copolymer in a ratio of about 2:1 weight percent of styrene-isoprene-styrene block copolymer to styrene-butadiene-styrene block copolymer. In yet another alternative embodiment of the above method, the sheet material is selected from a nonwoven web, woven web, or foam. In yet another alternative embodiment of the above method, the at least one sheet material is selected from a spunbond web, a meltblown web or a scrim. In yet another alternative embodiment of the above method, the at least one sheet material is necked.

The invention also contemplates film or filaments, and laminates thereof, made by the previously described methods and of the inventive compositions. Finally, the invention also contemplates personal care products, protective outerwear and protective coverings made from film, filaments and laminates of the described compositions.

BRIEF DESCRIPTION OF THE DRAWINGS

The invention will be better understood by reference to the following description of embodiments of the invention taken in conjunction with the accompanying drawings, wherein.

DETAILED DESCRIPTION OF THE INVENTION

Definitions

Figure 8:
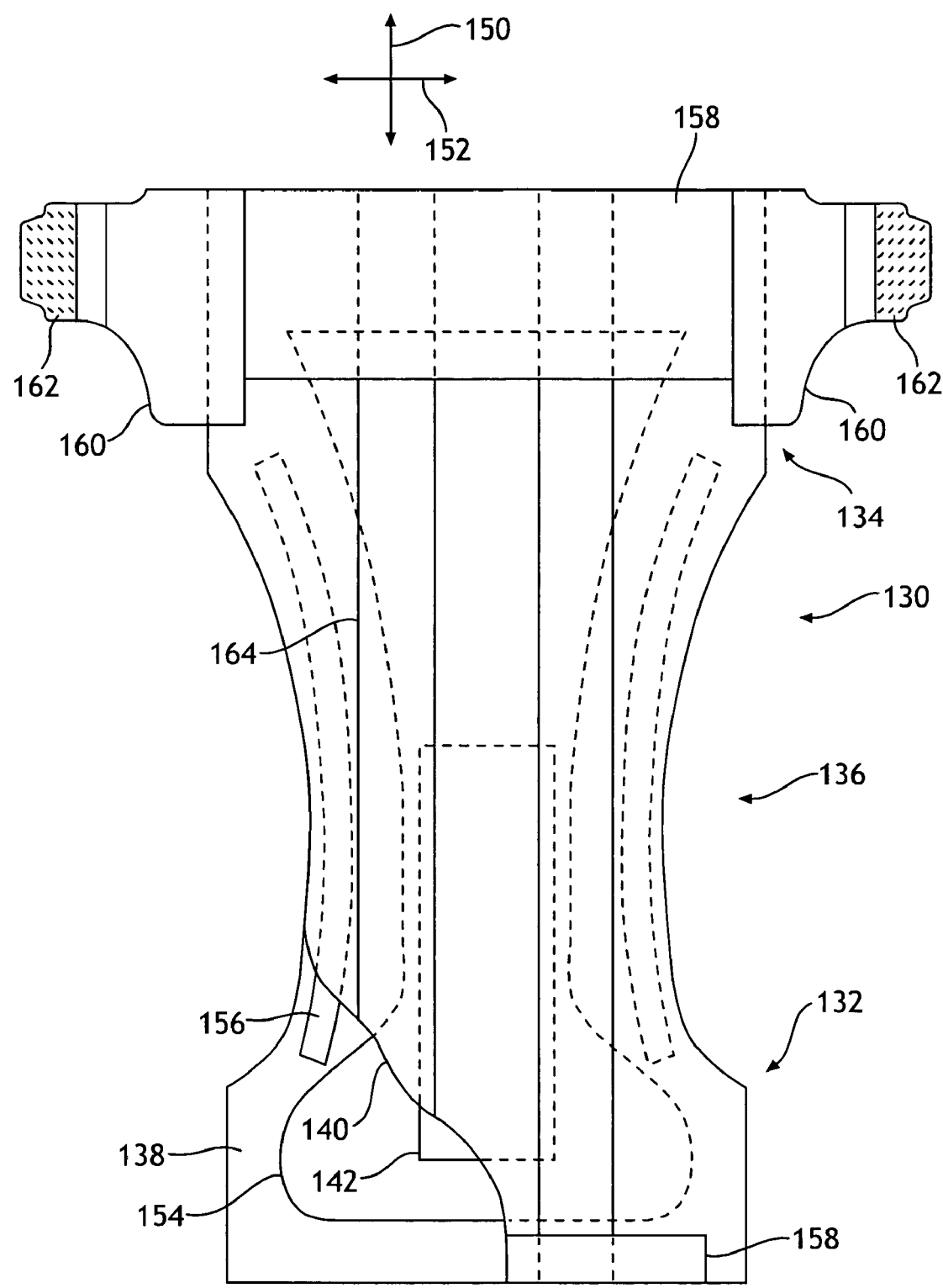
FIG. 8 illustrates a top view/partial sectional view of a personal care product in the form of a diaper showing use of various components therein made of a composition and material, according to the present invention.

As used herein, the term "personal care product" means diapers, training pants, swimwear, absorbent underpants, adult incontinence products, mortuary, veterinary and feminine hygiene products, such as feminine care pads, napkins and pantiliners. While a diaper is illustrated in FIG. 8, it should be recognized that the inventive composition may just as easily be incorporated into any of the previously listed personal care products as an elastic component. For instance, such composition may be utilized to make the elastic side panels of training pants, as described in U.S. Pat. Nos. 5,601,547, 4,940,464 and 4,641,381 each of which is incorporated by reference hereto in its entirety.

As used herein the term "protective outer wear" means garments used for protection in the workplace, such as surgical gowns, hospital gowns, masks, and protective coveralls.

As used herein, the term "protective cover" means covers that are used to protect objects such as for example car, boat and barbeque grill protective outer covers, as well as agricultural fabrics.

As used herein, the terms "polymer" and "polymeric" when used without descriptive modifiers, generally include but are not limited to, homopolymers, copolymers, such as for example, block, graft, random and alternating copolymers, terpolymers, etc. and blends and modifications thereof. Furthermore, unless otherwise specifically limited, the term "polymer" includes all possible spatial configurations of the molecule. These configurations include, but are not limited to isotactic, syndiotactic and random symmetries.

As used herein, the terms "machine direction" or MD means the direction along the length of a fabric in the direction in which it is produced. The terms "cross machine direction," "cross directional," or CD mean the direction across the width of fabric, i.e. a direction generally perpendicular to the MD.

As used herein, the term "nonwoven web" means a polymeric web having a structure of individual fibers or threads which are interlaid, but not in an identifiable, repeating manner. Nonwoven webs have been, in the past, formed by a variety of processes such as, for example, meltblowing processes, spunbonding processes, hydroentangling, air-laid and bonded carded web processes.

As used herein, the term "bonded carded webs" refers to webs that are made from staple fibers which are usually purchased in bales. The bales are placed in a fiberizing unit/picker which separates the fibers. Next, the fibers are sent through a combining or carding unit which further breaks apart and aligns the staple fibers in the machine direction so as to form a machine direction-oriented fibrous nonwoven web. Once the web has been formed, it is then bonded by one or more of several bonding methods. One bonding method is powder bonding wherein a powdered adhesive is distributed throughout the web and then activated, usually by heating the web and adhesive with hot air. Another bonding method is pattern bonding wherein heated calendar rolls or ultrasonic bonding equipment is used to bond the fibers together, usually in a localized bond pattern through the web and/or alternatively the web may be bonded across its entire surface if so desired. When using bicomponent staple fibers, through-air bonding equipment is, for many applications, especially advantageous.

As used herein the term "spunbond" refers to small diameter fibers which are formed by extruding molten thermoplastic material as filaments from a plurality of fine, usually circular capillaries of a spinneret with the diameter of the extruded filaments being rapidly reduced as by for example in U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,542,615 to Dobo et al., which are each incorporated by reference in their entirety herein.

As used herein, the term "meltblown" means fibers formed by extruding a molten thermoplastic material through a plurality of fine, usually circular die capillaries as molten threads or filaments into converging high velocity gas (e.g. air) streams which attenuate the filaments of molten thermoplastic material to reduce their diameter, which may be to microfiber diameter. Thereafter, the meltblown fibers are carried by the high velocity gas stream and are deposited on a collecting surface to form a web of randomly dispersed meltblown fibers. Such a process is disclosed, in various patents and publications, including NRL Report 4364, "Manufacture of Super-Fine Organic Fibers" by B. A. Wendt, E. L. Boone and D. D. Fluharty; NRL Report 5265, "An Improved Device For The Formation of Super-Fine Thermoplastic Fibers" by K. D. Lawrence, R. T. Lukas, J. A. Young; and U.S. Pat. No. 3,849,241, issued Nov. 19, 1974, to Butin, et al, which patent is incorporated by reference hereto in its entirety.

As used herein, the terms "sheet" and "sheet material" shall be interchangeable and in the absence of a word modifier, refer to woven materials, nonwoven webs, polymeric films, polymeric scrim-like materials, and polymeric foam materials.

The basis weight of nonwoven fabrics or films is usually expressed in ounces of material per square yard (osy) or grams per square meter (g/m$^2$ or gsm) and the fiber diameters useful are usually expressed in microns. (Note that to convert from osy to gsm, multiply osy by 33.91). Film thicknesses may also be expressed in microns or mil.

As used herein, the term "laminate" refers to a composite structure of two or more sheet material layers that have been adhered through a bonding step, such as through adhesive bonding, thermal bonding, point bonding, pressure bonding, extrusion coating or ultrasonic bonding.

To "neck" or "necked" refers to a process of tensioning a fabric in a particular direction thereby reducing the width dimension of the fabric in the direction perpendicular to the direction of tension. For example, tensioning a nonwoven fabric in the MD causes the fabric to "neck" or narrow in the CD and give the necked fabric CD stretchability. Examples of such extensible and/or elastic fabrics include, but are not limited to, those described in U.S. Pat. No. 4,965,122 to Morman et al. and U.S. Pat. No. 5,336,545 to Morman et al. each of which is incorporated by reference hereto in its entirety.

"Neck bonding" refers to the process wherein an elastic member is bonded to a non-elastic member while only the non-elastic member is extended or necked so as to reduce its dimension in the direction orthogonal to the extension. "Neck bonded laminate" refers to a composite elastic material made according to the neck bonding process, i.e., the layers are joined together when only the non-elastic layer is in an extended condition. Such laminates usually have cross directional stretch properties. Further examples of neck-bonded laminates are such as those described in U.S. Pat. Nos. 5,226,992, 4,981,747 to Morman and U.S. Pat. No. 5,514,470 to Haffner et al., each of which is incorporated by reference hereto in its entirety.

"Stretch bonding" refers to a process wherein an elastic member is bonded to another member while only the elastic member is extended, such as by at least about 25 percent of its relaxed length. "Stretch bonded laminate" refers to a composite elastic material made according to a stretch bonding process, i.e., the layers are joined together when only the elastic layer is in an extended condition so that upon relaxing the layers, the nonelastic layer is gathered. Such laminates usually have machine directional stretch properties and may be subsequently stretched to the extent that the nonelastic material gathered between the bond locations allows the elastic material to elongate. One type of stretch bonded laminate is disclosed, for example, by U.S. Pat. No. 4,720,415 to Vander Wielen et al., in which multiple layers of the same polymer produced from multiple banks of extruders are used. Other composite elastic materials are disclosed in U.S. Pat. No. 4,789,699 to Kieffer et al., U.S. Pat. No. 4,781,966 to Taylor and U.S. Pat. Nos. 4,657,802 and 4,652,487 to Morman and U.S. Pat. No. 4,655,760 to Morman et al., each of which are incorporated by reference hereto in their entirety.

"Neck-stretch bonding" generally refers to a process wherein an elastic member is bonded to another member while the elastic member is extended, such as by at least about 25 percent of its relaxed length and the other layer is a necked, non-elastic layer. "Neck-stretch bonded laminate" refers to a composite elastic material made according to the neck-stretch bonding process, i.e., the layers are joined together when both layers are in an extended condition and then allowed to relax. Such laminates usually have multi or omni-directional stretch properties.

As used herein, the term "elastomeric" shall be interchangeable with the term "elastic" and refers to sheet or filament-based material which, upon application of a stretching force, is stretchable in at least one direction (such as either the MD or the CD direction), and which upon release of the stretching force contracts/returns to approximately its original dimension. For example, a stretched material having a stretched length which is at least 50 percent greater than its relaxed unstretched length, and which will recover to within at least 50 percent of its stretched length upon release of the stretching force. A hypothetical example would be a one (1) inch sample of a material which is stretchable to at least 1.50 inches and which, upon release of the stretching force, will recover to a length of not more than 1.25 inches. Desirably, such elastomeric sheet contracts or recovers up to 50 percent of the stretch length in at least one particular direction, such as in either the machine direction or the cross machine direction. Even more desirably, such elastomeric sheet material recovers up to 80 percent of the stretch length in at least one particular direction, such as in either the machine direction or the cross machine direction. Even more desirably, such elastomeric sheet material recovers greater than 80 percent of the stretch length in at least one particular direction, such as in either the machine direction or the cross machine direction. Desirably, such elastomeric sheet is stretchable and recoverable in both the MD and CD directions.

As used herein, the term "elastomer" shall refer to a polymer which is elastomeric.

As used herein, the term "thermoplastic" shall refer to a polymer which is capable of being melt processed.

As used herein, the term "inelastic" or "nonelastic" refers to any material which does not fall within the definition of "elastic" above.

As used herein the term "set" refers to retained elongation in a material sample following the elongation and recovery, i.e. after the material has been stretched and allowed to relax during a cycle test. The term "permanent set" refers to the retained set after a period of time, such as after 1 minute.

The hysteresis value is determined by first elongating a sample to an ultimate elongation of a given percentage and then allowing the sample to retract to an amount where the amount of resistance is zero.

As used herein, the term "multilayer laminate" means a laminate including a variety of different sheet materials. For instance, a multilayer laminate may include some layers of spunbond and some meltblown such as a spunbond/meltblown/spunbond (SMS) laminate and others as disclosed in U.S. Pat. No. 4,041,203 to Brock et al., U.S. Pat. No. 5,169,706 to Collier, et al., U.S. Pat. No. 5,145,727 to Potts et al., U.S. Pat. No. 5,178,931 to Perkins et al., and U.S. Pat. No. 5,188,885 to Timmons et al., each incorporated by reference hereto in its entirety. Such a laminate may be made by sequentially depositing onto a moving forming belt first a spunbond fabric layer, then a meltblown fabric layer and last another spunbond layer and then bonding the laminate, such as by thermal point bonding. Alternatively, the fabric layers may be made individually, collected in rolls, and combined in a separate bonding step or steps. Multilayer laminates may also have various numbers of meltblown layers or multiple spunbond layers in many different configurations and may include other materials like films (F) or coform materials, e.g. SMMS, SM, SFS.

As used herein, the term "coform" means a process in which at least one meltblown diehead is arranged near a chute through which other materials are added to the web while it is forming. Such other materials may be pulp, superabsorbent particles, cellulose or staple fibers, for example. Coform processes are shown in U.S. Pat. No. 4,818,464 to Lau and U.S. Pat. No. 4,100,324 to Anderson et al., each incorporated by reference hereto in its entirety.

As used herein, the term "conjugate fibers" refers to fibers which have been formed from at least two polymers extruded from separate extruders but spun together to form one fiber. Conjugate fibers are also sometimes referred to as multicomponent or bicomponent fibers. The polymers are usually different from each other though conjugate fibers may be monocomponent fibers. The polymers are arranged in substantially constantly positioned distinct zones across the cross-section of the conjugate fibers and extend continuously along the length of the conjugate fibers. The configuration of such conjugate fiber may be, for example, a sheath/core arrangement wherein one polymer is surrounded by another or may be a side by side arrangement, a pie arrangement or an "islands-in-the-sea" arrangement. Conjugate fibers are taught in U.S. Pat. No. 5,108,820 to Kaneko et al., U.S. Pat. No. 4,795,668 to Krueger et al., and U.S. Pat. No. 5,336,552 to Strack et al. Conjugate fibers are also taught in U.S. Pat. No. 5,382,400 to Pike et al., and may be used to produce crimp in the fibers by using the differential rates of expansion and contraction of the two or more polymers. For two component fibers, the polymers may be present in varying desired ratios. The fibers may also have shapes such as those described in U.S. Pat. No. 5,277,976 to Hogle et al., U.S. Pat. No. 5,466,410 to Hills and U.S. Pat. Nos. 5,069,970 and 5,057,368 to Largman et al., which describe fibers with unconventional shapes, each of which is incorporated by reference hereto in its entirety.

As used herein the term "thermal point bonding" involves passing a fabric or web of fibers to be bonded between a heated calender roll and an anvil roll. The calender roll is usually, though not always, patterned in some way so that the entire fabric is not bonded across its entire surface, and the anvil roll is usually flat. As a result, various patterns for calender rolls have been developed for functional as well as aesthetic reasons. One example of a pattern has points and is the Hansen Pennings or "H&P" pattern with about a 30 percent bond area with about 200 bonds/square inch as taught in U.S. Pat. No. 3,855,046 to Hansen and Pennings, incorporated herein by reference hereto in its entirety. The H&P pattern has square point or pin bonding areas wherein each pin has a side dimension of 0.038 inches (0.965 mm), a spacing of 0.070 inches (1.778 mm) between pins, and a depth of bonding of 0.023 inches (0.584 mm). The resulting pattern has a bonded area of about 29.5 percent. Another typical point bonding pattern is the expanded Hansen Pennings or "EHP" bond pattern which produces a 15 percent bond area with a square pin having a side dimension of 0.037 inches (0.94 mm), a pin spacing of 0.097 inches (2.464 mm) and a depth of 0.039 inches (0.991 mm). Another typical point bonding pattern designated "714" has square pin bonding areas wherein each pin has a side dimension of 0.023 inches, a spacing of 0.062 inches (1.575 mm) between pins, and a depth of bonding of 0.033 inches (0.838 mm). The resulting pattern has a bonded area of about 15 percent. Yet another common pattern is the C-Star pattern which has a bond area of about 16.9 percent. The C-Star pattern has a cross-directional bar or "corduroy" design interrupted by shooting stars. Other common patterns include a diamond pattern with repeating and slightly offset diamonds with about a 16 percent bond area and a wire weave pattern looking as the name suggests, e.g. like a window screen pattern having a bond area in the range of from about 15 percent to about 21 percent and about 302 bonds per square inch.

Typically, the percent bonding area varies from around 10 percent to around 30 percent of the area of the fabric laminate. As is well known in the art, the spot bonding holds the laminate layers together as well as imparts integrity to each individual layer by bonding filaments and/or fibers within each layer.

As used herein, the term "ultrasonic bonding" means a process performed, for example, by passing the fabric between a sonic horn and anvil roll as illustrated in U.S. Pat. No. 4,374,888 to Bornslaeger, incorporated by reference herein in its entirety.

As used herein, the term "adhesive bonding" means a bonding process which forms a bond by application of an adhesive. Such application of adhesive may be by various processes such as slot coating, spray coating and other topical applications. Further, such adhesive may be applied within a product component and then exposed to pressure such that contact of a second product component with the adhesive containing product component forms an adhesive bond between the two components.

As used herein, and in the claims, the term "comprising" is inclusive or open-ended and does not exclude additional unrecited elements, compositional components, or method steps. Accordingly, such terms are intended to be synonymous with the words "has", "have", "having", "includes", "including", and any derivatives of these words.

As used herein, the terms "extensible" or "expandable" mean elongatable in at least one direction, but not necessarily recoverable.

Unless otherwise indicated, percentages of components in formulations are by weight.

Test Method Procedures:

Time Sweep Test Method:

The time sweep test method is a measurement of the processibility of polymers under certain conditions over time. In particular, the time sweep method is a rheological test method used to evaluate the thermal stability of elastic materials. The following equipment and conditions were employed to generate the processibility of polymers and polymer compositions of several embodiments of the inventive composition.

| | |
|---|---|
| Equipment: | Rheometrics SR5000 - stress rheometer, now of TA Instruments of New Castle, DE. |
| Geometry: | 25 mm cone and plate, serial #3215 |
| Test temperature: | 210-230° C. as noted |
| Time period: | 30-45 minutes as noted |
| Stress Mode: | Dynamic (oscillatory) |
| Frequency: | 10 rad/s (radians/sec) |
| Stress: | 5000 dynes/cm2 |
| Pre-shear: | 10 dynes/cm2 |
| Environment: | Dry air - as supplied by dry gas generator |

-continued

Samples were tested at various compositional ratios (SIS to SBS ratios) 1:1, 2:1, 3:1, and 4:1 to evaluate the possibility of offsetting the natural kinetics upon heating of each of the polymers and the thermal decomposition that normally occurs. A blended sample was placed in a melt state (210-230° C. as noted) in such an instrument and exposed to a constant stress (5000 dynes/cm2) at a fixed frequency (10 rad/s) for a period of time (30-45 min. as noted), while viscosity (Eta*) was plotted.

Sharp transitions over time in viscosity (Eta*) would be indicative of structural changes at the molecular level that could be assessed as capable or incapable of sustaining the polymer through the required time period for film casting or filament extrusion systems. Increasing viscosity typically indicates the materials are crosslinking (building structure), while a decreasing viscosity would indicate chain-scissioning (falling apart and a decrease in molecular weight). For the purposes of FIG. 3, which illustrate the results of this testing, the lines identified with the numbers 12-14 (Eta*($\diamond$)[P]) are representative of viscosity. The extent of increasing slope over time is therefore indicative of a polymer which is becoming more plastic in nature as a result of temperature and dwell time. Ideally, for extended processing, one would want a polymer that demonstrated approximately flat lines over an extended period of time for the viscosity attribute.

Such testing has shown that viscosity remained nearly level over an extended time, and at a high temperature, when unsaturated block copolymers are used in a 2:1 weight ratio blend (of SIS to SBS), and at least longer than olefins used by themselves in elastic film formulations. When viscosity lines of the graphs show a significantly positive slope, they are increasing in viscosity over time at such a level that will likely lead to manufacturing difficulties, such as channel or die clogging. By utilizing a particular ratio range of unsaturated block coplymers, such increase can be controlled, while providing the different elastic performance benefits of two cost effective polymers. For instance, SIS reduction in molecular weight can be reduced/slowed, leading to more steady tension levels in an extrusion product at lower polymer amounts. For the testing above, the polymer materials were dry blended as pellets. They were then pushed through a Leistritz ZSE 27 mm twin screw extruder (1 extrusion (abbreviated as 1 Ext.)) between 190-205° C. and then the extrudate was captured after exiting a 10 inch fishtale film die. The film sample was then cooled to room temperature and then placed on the rheometer described above under the conditions noted.

Material Elastic Performance:

Stretch to Stop Test:

"Stretch-to-stop" refers to a ratio determined from the difference between the unextended dimension of a stretchable laminate and the maximum extended dimension of a stretchable laminate upon the application of a specified tensioning force and dividing that difference by the unextended dimension of the stretchable laminate. If the stretch-to-stop is expressed in percent, this ratio is multiplied by 100. For example, a stretchable laminate having an unextended length of 5 inches (12.7 cm) and a maximum extended length of 10 inches (25.4 cm) upon applying a force of 2000 grams, has a stretch-to-stop (at 2000 grams) of 100 percent. Stretch-to-stop may also be referred to as "maximum non-destructive elongation." Unless specified otherwise, stretch-to-stop values are reported herein at a load of 2000 grams. In the elongation or stretch-to-stop test, a 3-inch by 7-inch (7.62 cm by 17.78 cm) sample, with the larger dimension being the machine direction, the cross direction, or any direction in between, is placed in the jaws of a Sintech machine using a gap of 5 cm between the jaws. The sample is then pulled to a stop load of 2000 gms with a crosshead speed of about 20 inches/minute (50.8 cm/minute). For the stretchable laminate material of this invention, in a desirable embodiment it demonstrates a stretch to stop value between about 30-400 percent, more desirably, between about 100-250 percent. The stretch to stop test is done in the direction of extensibility (stretch) at approximately 73° F. and about 50 percent relative humidity.

Figure 9:
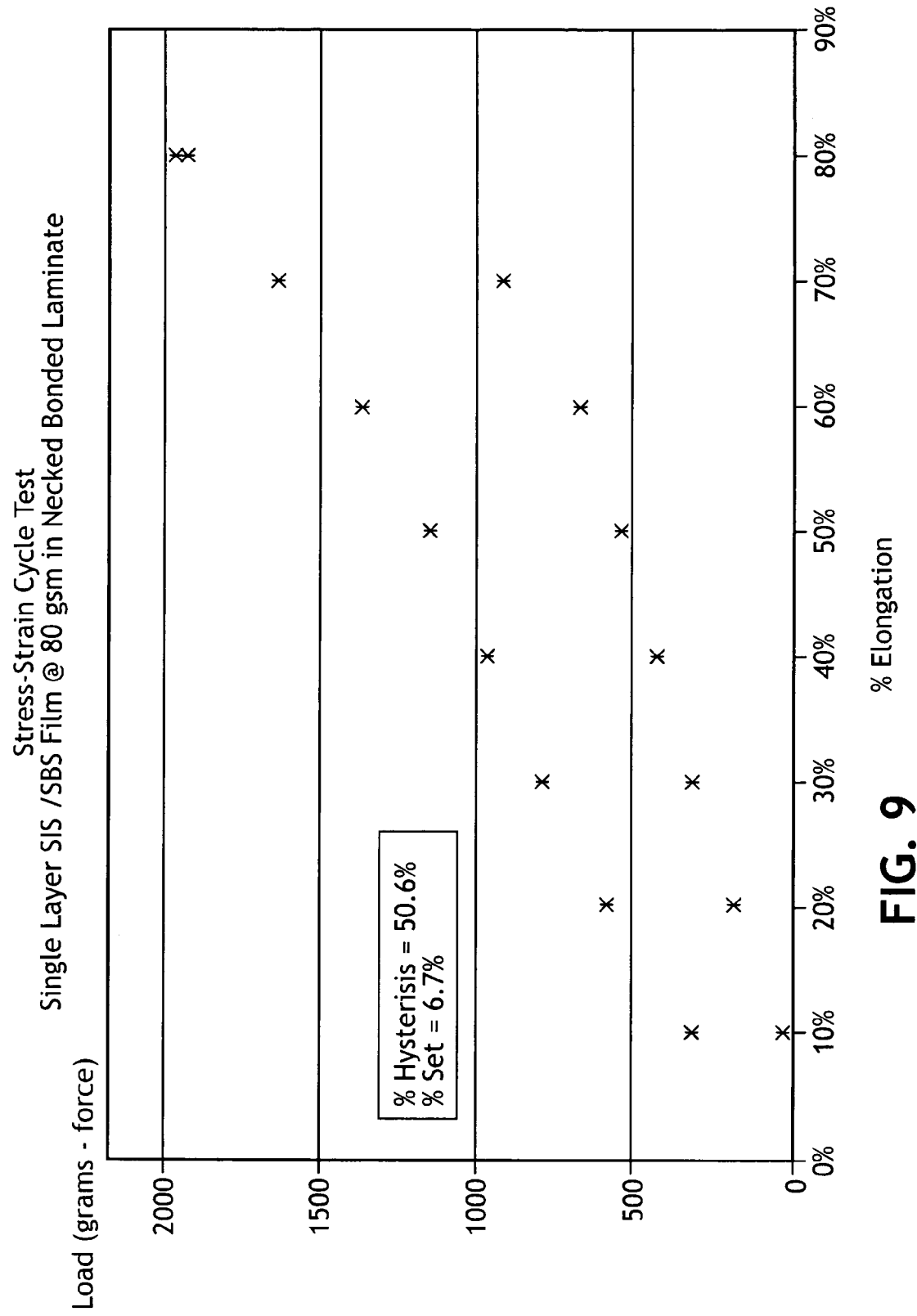
FIG. 9 illustrates a data plot of load versus percent elongation from a stress-strain cycle test for material of the present invention.
Figure 10:
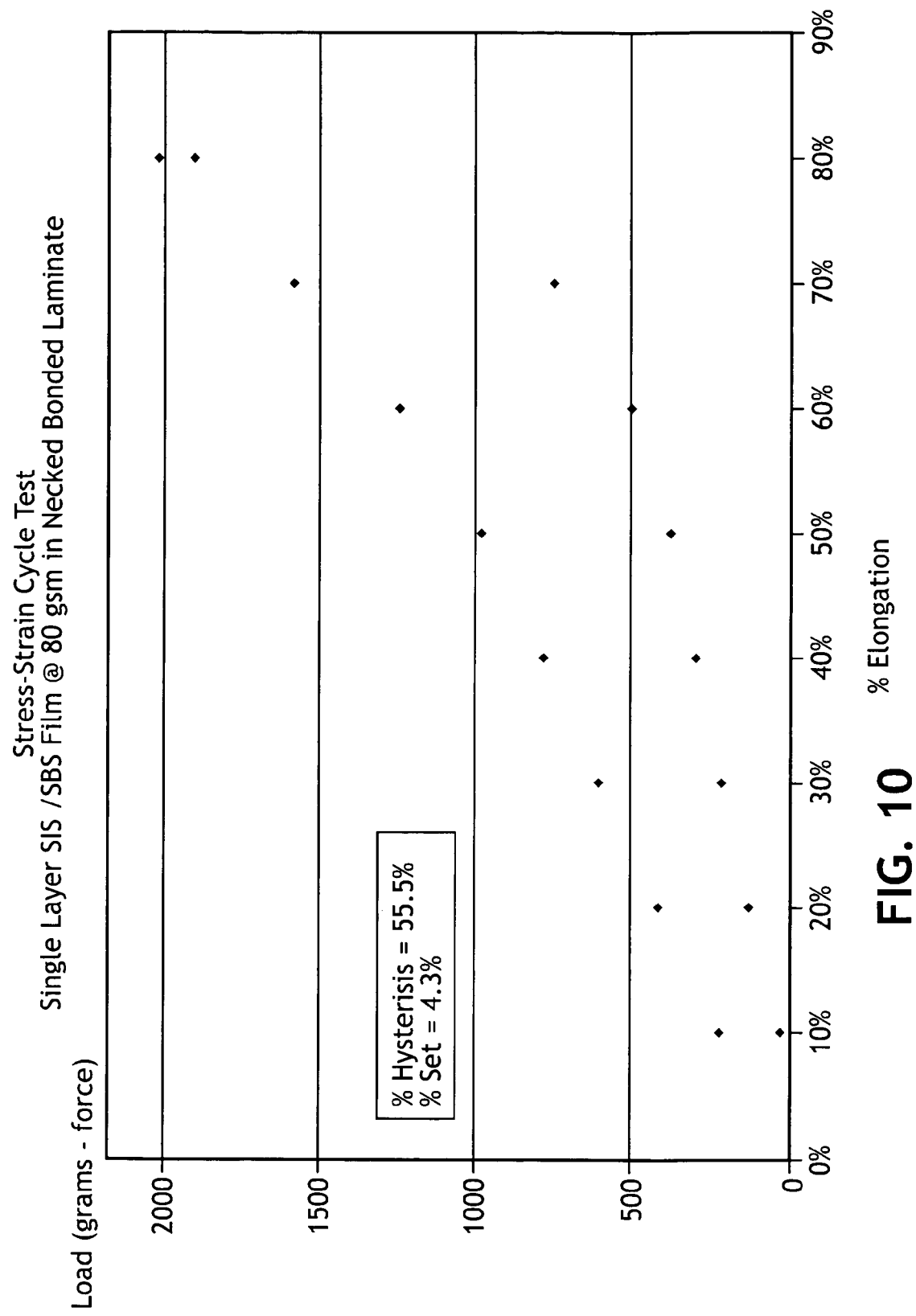
FIG. 10 illustrates a data plot of load versus percent elongation from a stress-strain cycle test for material of the present invention.

Stress-Strain Cycle Test (1 Cycle to 80% Elongation, as Presented in Data form FIGS. 9 and 10)

An elastic composite (laminate) sample of 3 inch wide and 6 inch long is placed in the clamps of a constant rate of extension (CRE) load frame, such as a SINTECH tensile tester commercially available from the MTS Systems Corporation, model Synergie 200, Eden Prairie, Minn. Starting at a 4 inch gauge length between the sample grips, the sample is elongated at 500 mm/min. (or approximately 20 inches/minute) to 80% elongation (7.2 in. jaw-span). The cross-head returns to the original 4 inch gauge length position. The data points at 10% elongation intervals on the first cycle are recorded and plotted in grams on the Y axis and % elongation on the X axis. Percent set was determined as the percent elongation at which the specimen reaches zero load on the return portion (i.e. retraction) of the cycle. Testing was at approximately 73° F. and about 50 percent relative humidity.

For percent hysteresis calculations, the data acquired was at a rate of 100 data points per cycle. The loading and unloading energy were calculated by integrating the area under the respective curves. Percentage hysteresis was then calculated according to the following equation.

% HYSTERESIS=[(LOADING ENERGY−UNLOADING ENERGY)/LOADING ENERGY]× 100.

The lower % hysteresis values correspond to better elastic efficiency of the composite measured.

It has been found that improved thermal stabilization and processing behavior of unsaturated styrenic block copolymers, such as styrenic butadiene or styrenic isoprene can be achieved by blending a composition of the unsaturated styrenic block copolymer(s) with at least one compatibilizer selected from the category group consisting of (1) high melt flow rate homopolymers or copolymers; (2) styrene-ethylenepropylene-styrene (SEPS) block copolymers; (3) ethylene vinyl acetate (EVA); (4) SBS; or SIS block copolymers; (5) single site catalyzed polyolefins, such as metallocene catalyzed and constrained geometry polyoplefins, such as metallocene catalyzed polyethylene or polypropylene typically having densities less than about 0.89 g/cc; (6) amorphous poly alpha olefin (APAO) homopolymer and copolymer grades; or (7) a combination of such, depending on the polymers to be blended. It should be recognized that compatibilizers from the above categories other than those of category (1), may themselves also demonstrate high metlflow rates.

In an alternative embodiment, such compatibilizer is a styrenic block copolymer having a high melt flow rate with a styrene content by weight of at least about ten (10) percent. In a further alternative embodiment, such compatibilizer is a styrenic block copolymer having a high melt flow rate with a styrene content by weight of at least about twenty (20) percent. In still a further alternative embodiment, such compatibilizer is a styrenic block copolymer having a high melt flow rate with a styrene content by weight of at least about thirty (30) percent. In yet a further alternative embodiment, such compatibilizer is a styrenic block copolymer having a high melt flow rate with a styrene content by weight of at least about forty (40) percent.

For the purposes of this application, the term "high melt flow rate" shall refer to a melt flow rate (MFR) of at least about 10. Such melt flow rate is in accordance with ASTM D1238 at 200° C./5 kg weight with the units expressed in g/10 min. In a further alternative embodiment, such melt flow rate is at least about 20. In a further alternative embodiment, such melt flow rate is at least about 30. In still a further alternative embodiment, such melt flow rate is at least about 40. In still a further alternative embodiment, such melt flow rate is between about 20 and 50. In one embodiment, such compatibilizer is present in the composition in an amount of between about 20 and 70 weight percent. In another embodiment, such high melt flow rate polymer is present in the composition in an amount of between about 20 and 70 weight percent.

Such unsaturated styrenic block copolymers are available from numerous suppliers under various trade designations. For instance, such polymers are available from Kraton Polymers, under the D designations, such as D1114 and DRP 6430 (SIS), and D1155, D1102 (SBS), from Dexco Polymers, under the designations VECTOR 4111 (SIS), VECTOR 4411 (SIS), VECTOR 4461 (SBS) for example, and also from Septon and Dynasol. Such single site catalyzed polymers are available from the Dow Chemical Co. under the trade name AFFINITY, or from ExxonMobil Corporation under the trade name EXACT. Such APAO polymers are exemplified by REXTAC R2732 available from Huntsman Chemical Co., and EASTOFLEX E1060 available from Eastman Chemicals. Such EVA polymers are exemplified by ELVAX 240, ELVAX 350, and ELVAX 3174, each available from DuPont and ESCORENE ULTRA from ExxonMobil.

For instance, by blending SEPS, and EVA polymers into either SIS or SBS block copolymers, a composition is formed that demonstrates at least temporary thermal (extrusion) processibility/stability for improved film formation quality. If a high melt flow rate polymer is utilized as a compatibilizer, it is desirably compatible with SBS or SIS without macroscopic phase separation. In an alternative embodiment, more than one such compatibilizer may be blended into the unsaturated block copolymer.

In a further alternative embodiment, blending of a high melt flow compatibilizer with an unsaturated styrenic block copolymer may be achieved with the high melt flow rate compatibilizer being present in the overall film or filament composition in an amount of between about 20 and 70 weight percent, and the unsaturated styrenic block copolymer being present in an amount of between about 30 and 80 weight percent. In an alternative embodiment, such high melt flow compatibilizer is present in an amount of between about 30 and 50 weight percent. In a further alternative embodiment, such unsaturated styrenic block copolymer is present in an amount of between about 50 and 70 weight percent. Additional materials may be added to the blend, such as additional processing aids, or pigment agents. Such additional processing aids may include relatively small amounts of high melt flow rate saturated styrenic block copolymers. Such saturated styrenic block copolymers include polymers available from Kraton Polymers under the "G" designation, as well as polymers available from Septon, such as SEPTON 2004. If present, such additional processing aids may be present in an amount of between about 0 and 20 weight percent. In a further alternative embodiment, such additional processing aids may be present in an amount of between about 0 and 15 weight percent. Such coloring agents (pigments) may be present in an amount of between about 0 and 5 weight percent. Such coloring agents are exemplified by pigments, titanium dioxide and the like.

In still a further alternative embodiment, an improved SIS/SBS elastic film composition includes at least about 85% SIS and/or SBS unsaturated block copolymers with either 20-100% (wt.) of the above polymers being higher melt flow rate block copolymers (melt flow rate in accordance with the described ASTM D 1238 greater than about 30, more desirably greater than about 40) having a high styrene content of between about 30-50% (weight percent), and 0-80% (weight percent) block copolymers having melt flow rates of between about 2-20 under the stated ASTM, and having a styrene content of between about 10-30% (weight percent), and further having up to 15% (weight percent) block copolymers such as SIS, SBS, SEBS, SEPS. Such polymers may be blended with some inorganic fillers, colorants, pigments, and antiblocking agents. An example of such a colorant includes $TiO_2$. An example of such an antiblocking agent includes diatomaceous earth such as SUPERFLOSS DE available from the Celite Corporation of Lompoc, Calif. The previously described block copolymers may be obtained from a variety of suppliers, such as those mentioned above.

In still a further alternative embodiment, it has been discovered that if certain ratios of SBS block copolymer compatibilizer are blended with SIS block copolymers, the thermal stability over a lengthy period of extrusion/processing time and temperature ranges can be achieved when such blended unsaturated styrenic block copolymers are used as a film or filament blend or further blended with additional polymers, such as polyolefinic homopolymers or copolymers. For instance, it has been found that when SIS and SBS polymers are blended in a ratio range between about 1.5:1 and 2.5:1 in a composition (either together or alternatively, together but also with additional polymers), such composition is thermally stable for temperatures up to about 210° C. and for up to about 30 minutes. In a further alternative embodiment, such thermal stability is provided to the composition up to about 230° C. and between 45-60 minutes. In still a further alternative embodiment, SIS block copolymer is blended with SBS block copolymer in a ratio range of between about 1.8:1 and 2.3:1. In still a further alternative embodiment, SIS block copolymer is blended with SBS block copolymers in a ratio of about 2:1. Such SIS and SBS blended polymers may be used as a base blend for a film or filament composition, or alternatively, may then be further blended with additional polymers, such that the SIS and SBS blended component is present in the prescribed ratio ranges, and in the overall blend (including all other components) in an amount of between about 5 and 100 weight percent. In still a further alternative embodiment, such blended SIS and SBS component is present in the overall composition in an amount of between about 5 and 50 percent. In still a further alternative embodiment, such blended SIS and SBS polymers are present in an overall composition in an amount of about 20 weight percent, alternatively about 30 weight percent, further alternatively, about 40 weight percent. It is again emphasized that in each of these embodiments, the SIS and SBS block copolymer components be present with respect to each other in the ratios described above. In such embodiments, the other polymer component or polymer processing aid and/or filler component (if there is any) is present in respective alternative weight percentages of 80, 70 and 60 percent. Examples of such other polymers include lower performance plastomer materials, such as the single site catalyzed materials previously described. An example of such a single site catalyzed polymer is AFFINITY EG8200, which may be blended with SIS (KRATON DRP 6430) and SBS (KRATON D1102), with the SIS being present in about a 2:1 ratio with the SBS, and the SIS/SBS blend being present at about 30 percent of the overall polymeric composition. Such materials may be blended in an extruder and cast into a film under conditions similar to those previously described.

In still another alternative embodiment, such improved thermal stabilization may be achieved by a method which blends various ratios of at least two distinct unsaturated styrenic block copolymers with each other prior to being further blended with another polymer component. The combined blend may then be cast into a film or extruded into filaments.

Such precasting or preextrusion blending can occur as a dry blending step, or as a compounding step. Essentially, if a dryblending step is preferred, the polymer components, i.e. the unsaturated styrenic block copolymer and compatibilizer polymer may be introduced into a hopper as pellets together (in their respective desired weight percentages). Additional polymer may then be added in a second step, with the combined blend composition then passed through either a single or twin screw extruder to either a casting die or a filament extrusion die. Alternatively, all polymers may be added together into a hopper prior to casting or extrusion, but in the desired weight percentages. Such combined blend may then be run through a single or twin screw extruder prior to being cast into film or extruded into filaments.

Figure 4:
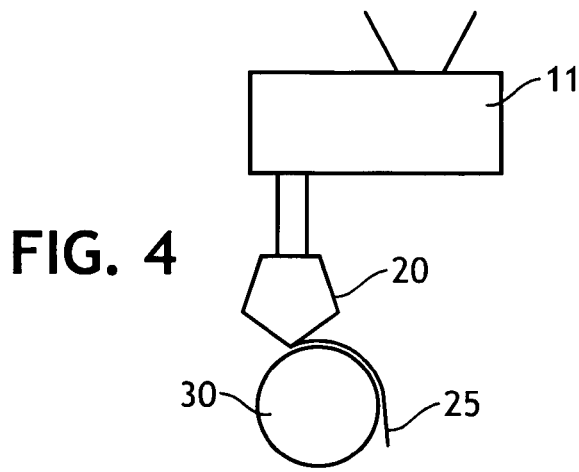
FIG. 4 illustrates a film manufacturing process using the inventive composition.

Such blending and casting step is illustrated in the schematic of FIG. 4, in which polymers are fed into a hopper of a twin screw extruder 11 or high intensity mixer, (both available from Farrel Corporation, of Ansonia, Conn.) and are dispersively mixed in the melt, by the action of the intermeshing rotating screws or rotors. The resulting mixture is mixed in a single step with any other desired polymer in the desired weight percentages. As previously stated, such precasting or preextrusion blending ("preblending") can likewise be achieved by first compounding the unsaturated polymers and/or compatibilizer into resin pellets and then further blending the "preblended" unsaturated polymers and/or compatibilizer pellets into a mix with an additional polymer.

Additional polymers to be added to the blended unsaturated block copolymer and compatibilizer, include ethylene vinyl acetate and single site catalyzed polypropylene, single site catalyzed polyethylene, copolymers of such, or blends of such. In any event such polymers are desirably thermoplastic elastomers or plastomers, such that the entire blended composition (whether it be the blended unsaturated block copolymers as the majority component, or as the minority component) performs as a thermoplastic elastomer.

Figure 5A:
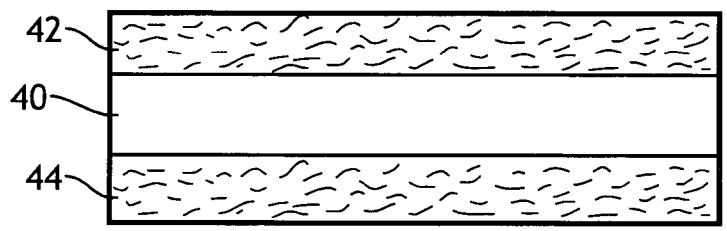
FIG. 5A is a cross sectional view of a single layer film as part of a film/nonwoven laminate made in accordance with the invention.
Figure 5B:
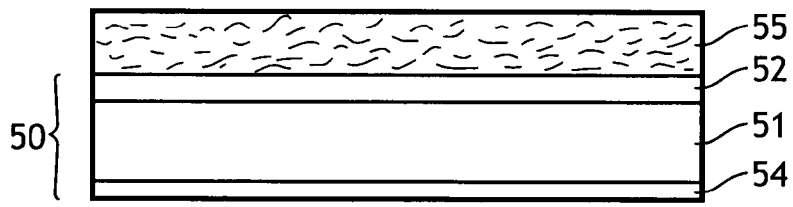
FIG. 5B is a cross sectional view of a mulilayered film as part of a film/nonwoven laminate made in accordance with the invention.
Figure 5C:
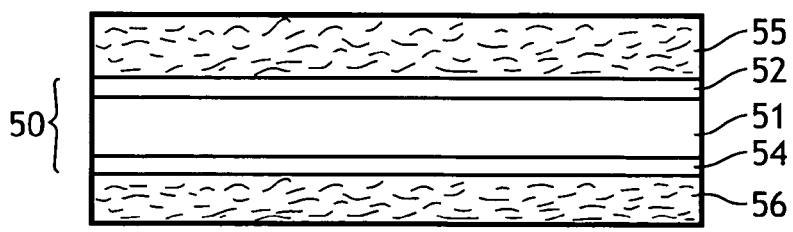
FIG. 5C is a cross sectional view of the multilayered film of FIG. 5B in a film/nonwoven laminate with two nonwoven facing layers.

As previously described, the polymer blend composition can be cast into a film. As can be seen in FIG. 4, the polymer resin composition may be processed into a film via a melt pump (not shown) feeding a film die 20. The film may either be cast or blown, but extruded at temperatures between about 360 and 450° F. or in an alternative embodiment, between about 380 and 420° F. As shown, the film 25 may be cast onto a chill roll 30. The extruded film may be a single layer film 40 (as seen in FIG. 5A), or part of a multi-layer film 50 (as seen in FIGS. 5B and 5C), which can include one or more skin layers 52, 54 (such as in an ABA structure) immediately adjacent, and on each side of a core layer 51 of the present composition. If multilayer films are to be produced, such additional layers may be produced by a lamination process or by coextrusion with the core layer. Such film may be further attached to an additional sheet material or materials, such as a nonwoven web material (i.e. spunbond, meltblown, coform, airlaid, bonded carded web layers), scrims, foam, additional films or various combinations of each, to form a film/sheet material laminate. As seen in FIGS. 5A, 5B, and 5C, such film/nonwoven laminates may include one or more nonwoven sheets 42, 44, and 55, and 56 to form a multi-layered laminate. Such nonwoven layers may also include elastic materials, or nonwovens selected for their individual attributes, such as conjugate fiber nonwovens, or necked nonwovens, so as to provide CD extensibility/elasticity. Such laminate may be produced by various known lamination techniques, such as adhesive bonding lamination (typically between a set of nip rolls), thermal or thermal point/pattern bonding, or ultrasonic bonding. Such blended composition material may therefore also be the elastic component of a neck bonded laminate, a stretch bonded laminate, or a neck stretch bonded laminate.

Desirably, if such blended polymer material is manufactured into film, the basis weight of such cast or blown film is between about 5 and 150 gsm. Even more desirably, the basis weight of such film is between about 10 and 80 gsm. In a further alternative embodiment, the basis weight of the film is between about 20 and 40 gsm. In one embodiment, it is desirable that each of such nonwoven layers of a film/nonwoven laminate, have a basis weight of between about 0.25 osy and 1.5 osy. In still a further alternative embodiment, the basis weight of each of such nonwoven layers is between about 0.4 to 0.8 osy. In another alternative embodiment, such nonwoven material is itself extensible/stretchable. Such extensibility may be achieved either by pretreating the nonwoven material in a process such as necking to produce a necked nonwoven material (as part of a necked-bonded laminate) such as by running the nonwoven material through a series of roll nips running at different speeds, or through a set of grooved rolls. In one embodiment, such necking is between about 25 and 60 percent, to give the laminate produced from such inventive and necked material CD extensibility.

Alternatively, the inventive polymer composition may be directed to a filament extruding die such as those filaments that may be formed from vertical or horizontal filament extrusion platforms. Such extrusion systems are described in conjunction with lamination processes for making filament-based stretch-bonded laminates in copending U.S. Patent Publication No. 2002-0104608, published 8 Aug. 2002, or alternatively, in U.S. Pat. No. 5,385,775 to Wright; each of which is incorporated by reference herein in its entirety.

Figure 6:
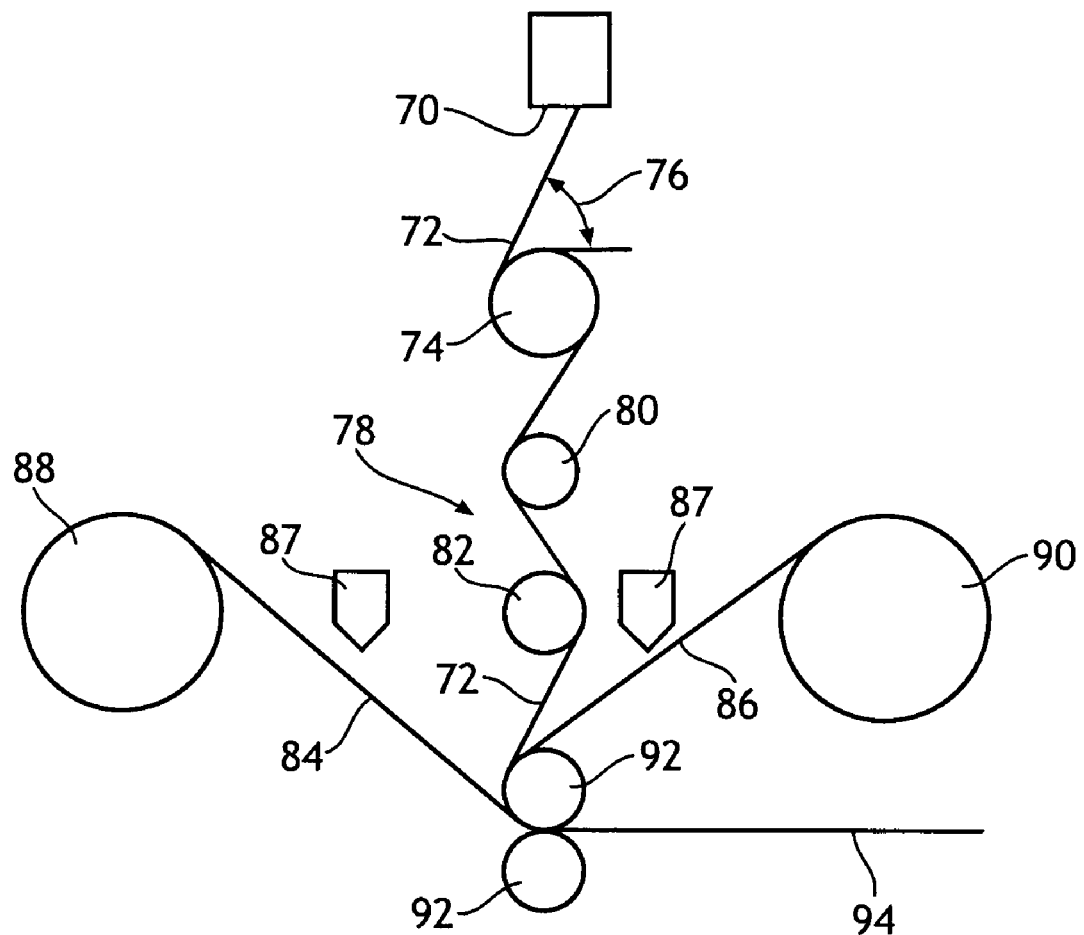
FIG. 6 illustrates a stretch bonded lamination process of a vertical nature, for using the inventive composition.

FIG. 6 schematically illustrates a vertical filament laminate manufacturing process for the manufacture of elastic laminates 94 produced from the inventive elastic composition. Referring to FIG. 6, at least one molten elastomeric material, e.g. the blended unsaturated styrenic block co-polymer material, is extruded from a die extruder 70 through spinning holes as a plurality of substantially continuous elastomeric filaments 72. The extruder may be extruding at temperatures between about 360 and 500° F., alternatively between about 380 and 450° F. A film die for producing sheets or ribbons may also be used in alternative embodiments. The filaments 72 are quenched and solidified by passing the filaments 72 over a first chill roll 74. Any number of chill rolls can be used. Suitably, chill rolls may have a temperature of between about 40° F. to about 80° F.

The die of the extruder 70 may be positioned with respect to the first roll so that the continuous filaments meet this first roll 74 at a predetermined angle 76. This strand extrusion geometry is particularly advantageous for depositing a melt extrudate onto a rotating roll or drum. An angled, or canted orientation provides an opportunity for the filaments to emerge from the die at a right angle to the roll tangent point resulting in improved spinning, more efficient energy transfer, and generally longer die life. This configuration allows the filaments to emerge at an angle from the die and follow a relatively straight path to contact the tangent point on the roll surface. The angle 76 between the die exit of the extruder 70 and the vertical axis (or the horizontal axis of the first roll, depending on which angle is measured) may be as little as a few degrees or as much as 90 degrees. For example, a 90 degree extrudate exit to roll angle could be achieved by positioning the extruder 70 directly above the downstream edge of the first roll 74 and having a side exit die tip on the extruder. Moreover, angles such as about 20 degrees, about 35 degrees, or about 45 degrees, away from vertical may be utilized. It has been found that, when utilizing a 12-filament/inch spinplate hole density, an approximately 45 degree angle (shown in FIG. 6) allows the system to operate effectively. The optimum angle, however, may vary as a function of extrudate exit velocity, roll speed, vertical distance from the die to the roll, and horizontal distance from the die centerline to the top dead center of the roll. Optimal performance can be achieved by employing various geometries to result in improved spinning efficiency and reduced filament breakage.

After the series of generally parallel filaments 72 (filament array) are quenched and solidified, they are stretched or elongated using a first series of stretch rolls 78. The first series of stretch rolls 78 may comprise one or more individual stretch rolls and suitably at least two stretch rolls 80 and 82, as shown in FIG. 6. Stretch rolls 80, 82 rotate at a speed greater than a speed at which chill roll 74 rotates, thereby stretching the filaments 72.

In one embodiment of this invention, each successive roll rotates at a speed greater than the speed of the previous roll. For example, referring to FIG. 6, if the chill roll 74 rotates at a speed "x"; stretch roll 80 rotates at a still greater speed, for example about 1.15x; second stretch roll 82 rotates at a still greater speed, for example about 1.25x to about 7x. As a result, the filaments 72 may be stretched by about 100 percent to about 800 percent of an initial pre-stretched length.

After the filaments 72 are stretched, they are laminated (while in a stretched configuration) to the first facing material 84 and optionally at the same time to a second facing material 86, typically by an adhesive process as exemplified by the illustrated adhesive distribution units, collectively 87, shown as applying adhesive to the facing materials 84, 86. The first facing material 84 is unwound from a roll 88 and laminated to a first side of the filaments 72. The second facing material 86 is unwound from a second roll 90 and laminated to a second side of the filaments 72. Before the facing materials 84, 86 are laminated to the filaments, they may be necked by additional rolls (not shown). One or more of the facing materials may be nonwoven web material, or laminates thereof, according to the present invention. The laminate material is then passed through nip rolls 92 to bond the elastic filaments to the facings 84, 86 by adhesion. The nip rolls 92, may alternatively be used in place of, or in addition to, the stretch rolls 80, 82 to achieve stretching. The laminate material is then allowed to relax thereby allowing the retracting elastomeric filaments to form gathers in the facing materials.

The nip rolls may be designed to provide a patterned roll which may yield certain benefits such as increased bulk or stretching of the laminate and may be used where the strength of the contact adhesion between and among the facings and the strands is not unduly affected. The calender rolls can be heated to a degree below the melting points of the various laminate components, or may be ambient, or chilled.

Figure 7:
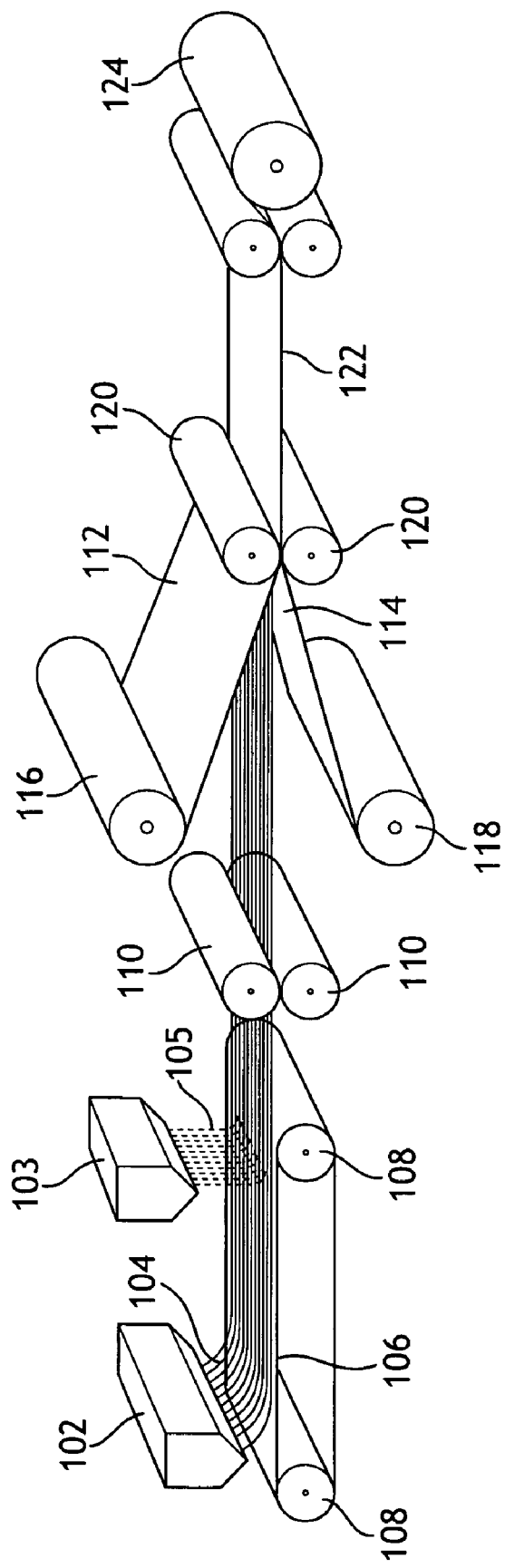
FIG. 7 illustrates an alternative stretch bonded lamination process of a horizontal nature, for using the inventive composition.

FIG. 7 illustrates a horizontal, continuous filament laminate manufacturing process for making another elastic laminate of the invention. A first extrusion apparatus 102 is fed with a polymer blend composition of the invention from one or more sources (not shown) which is extruded onto a forming surface 106 in filament form. In various embodiments, the extrusion apparatus 102, or a second extrusion apparatus 103, can be configured to produce other materials, e.g. thermoplastic fibers such as meltblown fibers 105, to achieve the inline placement of layers of different materials. Techniques for fiber extrusion, such as modified meltblowing of the fibers, are further set forth in the previously mentioned U.S. Pat. No. 5,385,775 to Wright. Apparatus 102 extrudes filaments 104 directly onto a conveyor system, which can be a forming surface system 106 (e.g., a foraminous belt) moving clockwise about rolls 108. A vacuum (not shown) can also help hold the filaments 104 against the foraminous wire system.

The filaments 104 are then stretched by tensioning rolls 110 to elongate and tension the filaments. Desirably the tension rolls 110 are provided with a surface having little to no affinity for the filaments 104 or fibers 105. Such tensioning rolls may alternatively serve to lightly calender the filaments and meltblown layers together. Still in a further alternative embodiment, such rolls 110 may be absent entirely, and instead such tensioning may be accomplished using the nip bonding rolls 120 described below.

After the filaments 104 are directed through optional tensioning rolls 110, they are laminated to the first facing material 112 and desirably at the same time to a second facing material 114. One or both of the facing materials may be nonwoven material, or laminates thereof, according to the present invention. The first facing material 112 is unwound from a roll 116 and laminated to a first side of the filaments 104. The second facing material 114 is unwound from a second roll 118 and laminated to a second side of the filaments 104. Before the facing materials 112, 114 are laminated to the filaments 104 the facing materials may also be stretched by additional rolls (not shown) so as to neck the facing materials. The laminate material is then passed through nip rolls 120 to bond (and in some embodiments to provide tension for) the elastic filaments to the facings 112, 114 to produce the elastic stretch bonded laminate 122. The elastic laminate 122 is then allowed to relax, forming gathers therein, and is collected on a collection roll 124 for further use.

As in the vertical manufacturing process, the nip rolls 120 may be desirably designed to provide a 100 percent bond area through the use of flat calender rolls or may provide a patterned bond area. The rolls 120 can be heated to a degree below the melting points of the various laminate components, or may be ambient, or chilled. If such blended polymeric material is extruded as filaments, it is desirable that such filaments have an average diameter in the range from about 50 to about 500 microns, for example, from about 100 to about 200 microns. Such filaments may then be bonded to additional sheet materials as previously described. The basis weight of nonwoven materials bonded to such filaments is desirably between about 0.25 and 1.5 osy.

EXAMPLES

In demonstrating the efficacy of blending various compatibilizers with unsaturated styrenic block copolymers to allow for the extrusion of a uniformly viscous material without an increase in modulus or other negative processing effects over an extended time, a series of blends where evaluated.

Figure 1:
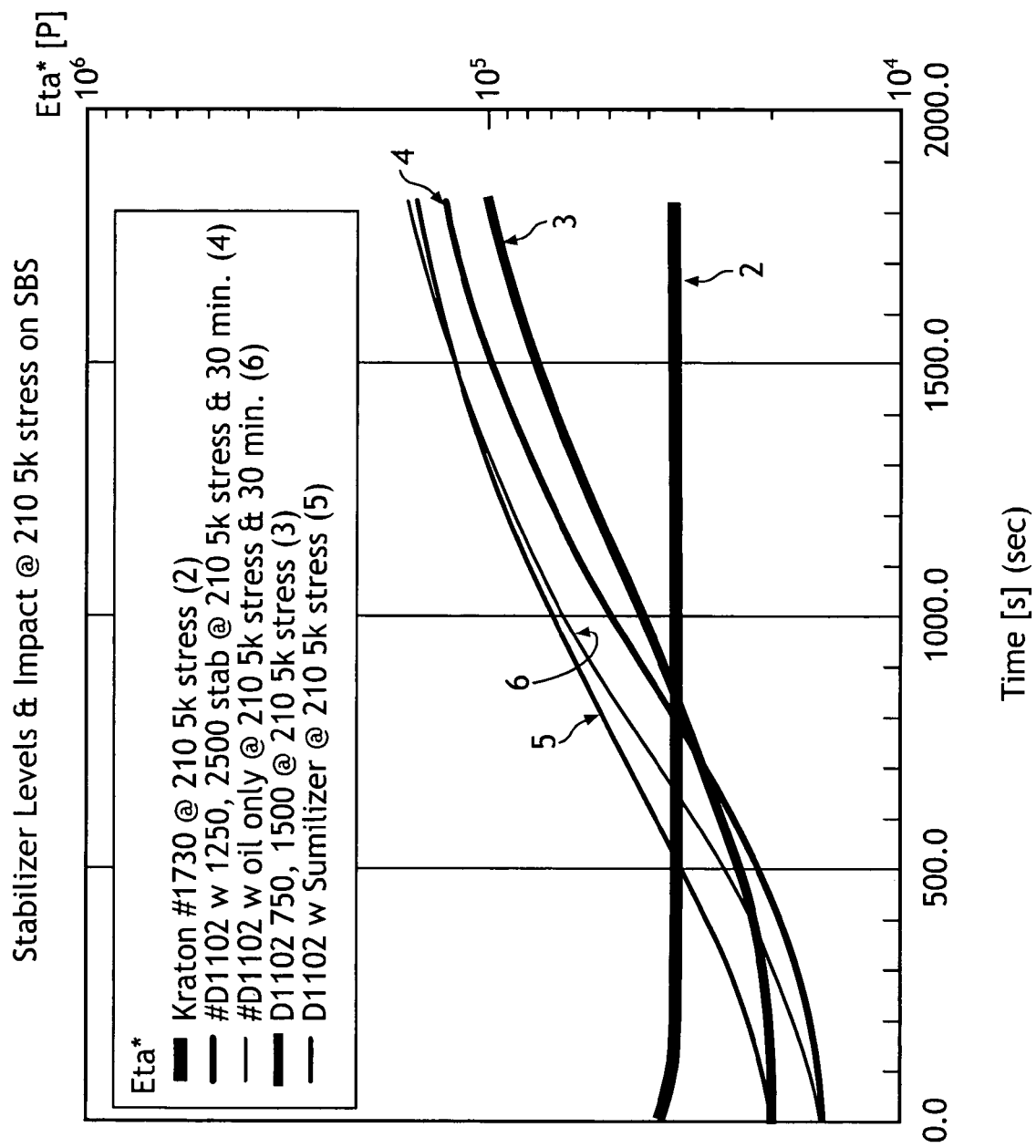
FIG. 1 is a graph demonstrating variation in extrusion viscosity during processing over time for SBS materials with use of a variety of stabilizers, over a half hour extrusion period and at 210° C.
Figure 2:
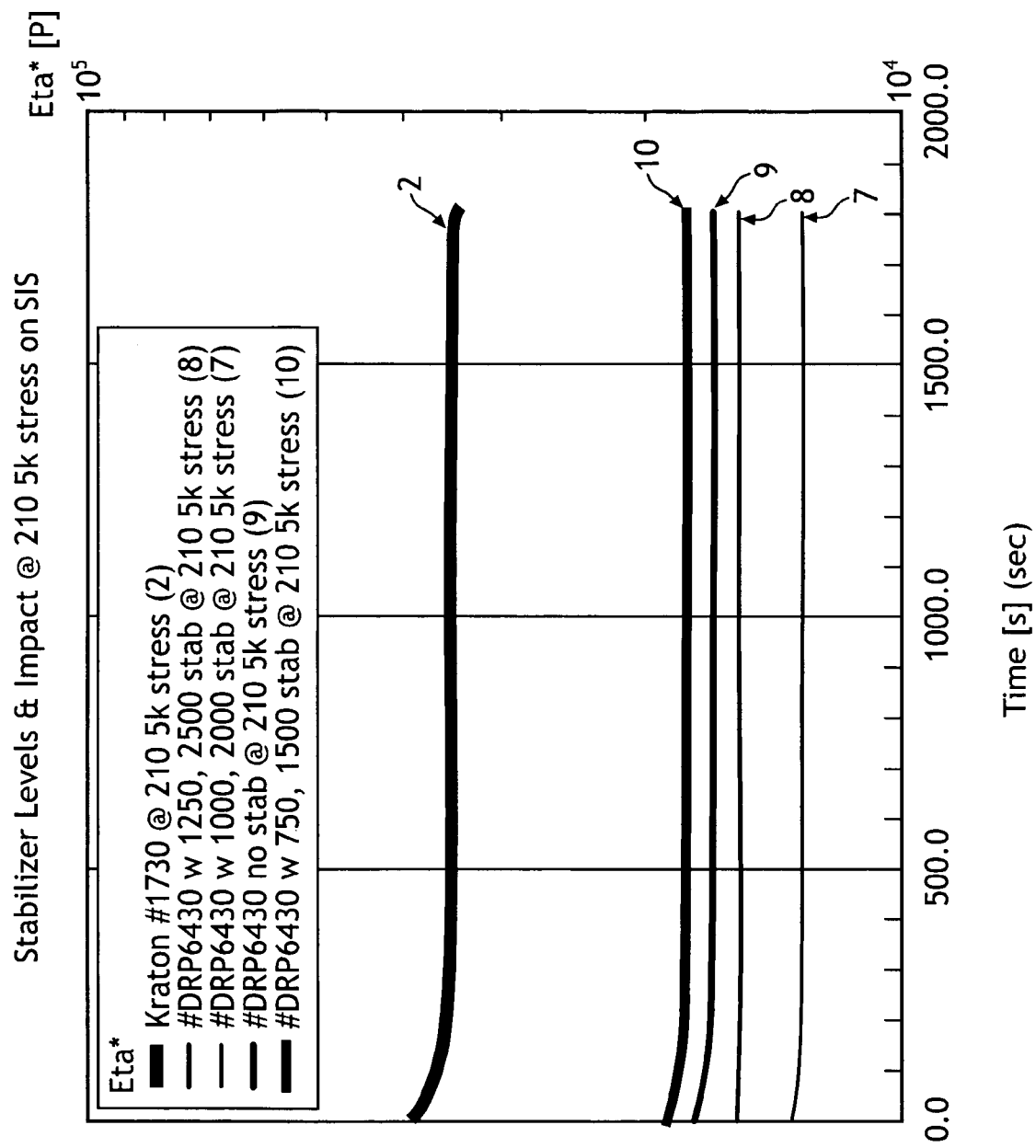
FIG. 2 is a graph demonstrating variation in extrusion viscosity during processing over time for SIS materials with a variety of stabilizers, over a half hour extrusion period and at 210° C.
Figure 3:
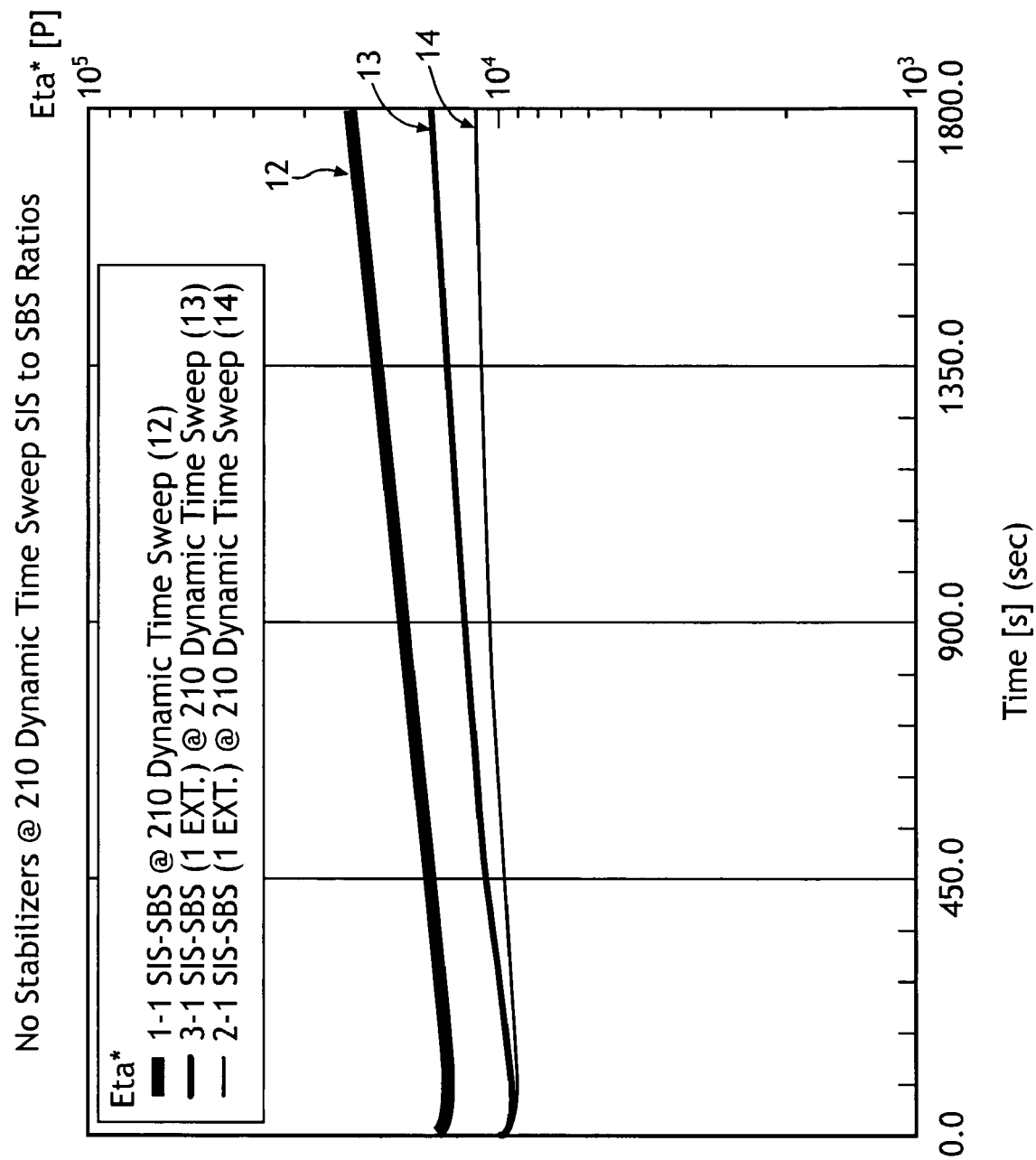
FIG. 3 is a graph demonstrating variation in extrusion viscosity over time for blended SIS and SBS materials in various ratios, that is for blended KRATON DRP 6430 and D1102 in a 1:1 weight percent ratio, a 3:1 ratio and a 2:1 ratio, over a half hour extrusion period at 210° C.

In a first set of examples, a series of mixed styrenic polymer blends were prepared in 1:1, 2:1, 3:1, and 4:1 weight ratios of SIS to SBS. The blends included no other polymer component. The various blends were as follows:

Blends of Only SIS and SBS Polymers:

A blend of only SIS and SBS in a 1:1 ratio was evaluated using the time sweep test method. As illustrated in FIG. 3, the blend 12, demonstrated a sizeable increase in the slope of viscosity over the time period of 30 minutes. A blend of only SIS to SBS in a 2:1 ratio was then evaluated. As reflected in the same Figure, this blend 14 produced a relatively flat viscosity line, indicative of its thermal stability in the extrusion process. A blended ratio of 3:1 of SIS to SBS was then evaluated. This blend 13 skewed the viscosity slope, making the material less stable for extrusion purposes. In a non-graphed evaluation, additional KRATON D SIS and SBS polymers were evaluated (KRATON D 1155 and KRATON D 1114), and in the same ratios. Similar results were observed. In similar analysis, examples of such SIS and SBS ratio blends were evaluated with additional metallocene-catalyzed polymer components in ratios of between 20:80 and 40:60 (SIS/SBS blend to other component). Similar processing results were observed.

In evaluating the examples, it was determined that the blended SIS and SBS polymer resins demonstrated a relatively constant viscosity, and exhibited an increased ability to withstand degradation in the extrusion process as the ratio of blended styrenic isoprene to styrenic butadiene approached 2:1. The ability of the 2:1 blend to withstand the temperatures commonly encountered in a melt over an extended period allows such polymers to be processed into film and filaments using manufacturing processes that would normally degrade the polymers. Such films or filaments may be extruded entirely of such SIS and SBS blends, or in conjunction with other polymers, so as to provide other polymers such as single site catalyzed polyolefins, with the additional elastic attributes that SIS and SBS polymers offer.

Exemplary Blends of High Melt Flow Rate Compatibilizers with SIS/SBS Polymers:

Examples of various compatibilizers were also evaluated in films, and that utilized either specifically SBS or high melt flow rate homopolymers or copolymers as compatibilizers. Such examples used various compositional formulations to cast film from an extruder to a chill roll. The films demonstrated better formation/evenness, the absence of holes and no edge tearing. It was determined that the incorporation of a high melt flow rate compatibilizer into an SIS or SBS formulation made the formulation less sensitive to temperature variation during the film extrusion process, even though the base polymer was an unsaturated styrenic block copolymer. A series of these examples are described below.

A single layer elastic film (such as that illustrated in FIG. 5A as 40) was produced by dry blending 69% VECTOR 4111 (SIS) with 29% VECTOR 4461 (SBS) and 2% of a whitening compound (containing 50% titanium dioxide with 50% polyethylene). As with previous percentages, all percentages are by weight. The formulation was specifically dry blended in a rotary mixer and using a single screw extruder, cast into a film via a coat hanger style film die (14" wide Randcastle). The last extruder temperature zone and hose were approximately between 380-385° F., while the die temperatures ranged from between 385-400° F. The film was cast onto a chilled TEFLON (PTFE) coated roll at 8 feet per minute (fpm) and then passed over a series of idler rolls at minimal film stretch to a combining nip, where the film was combined with two layers of facings, one on each side of the film, as illustrated in FIG. 5A. The film was then wound up. The facing layers were necked spunbond having been previously necked between about 56 and 60 percent, and having a final basis weight of about 0.75 osy (ounces per square yard) or approximately 25 gsm (grams per square meter). The film produced had a basis weight of about 2.4 osy or approximately 80 gsm. No adhesive or bonding means was used in this combination step. In a second step, the three layer unbound composite was then unwound and point bonded via an ultrasonic method (Herrmann 2000CS Ultrasonic generator) with a rotary anvil and stationary horn. The newly formed elastic laminate produced had appreciable elastic properties. For example, in a stress strain evaluation based on an 80 percent elongation cycle test of 3 inch wide by 4 inch long samples and at a crosshead speed of approximately 500 mm/min, the film/nonwoven laminate demonstrated a percent hysteresis value of about 50.6 percent and a set of about 6.7 percent. The maximum load force was 2000 grams.

In a further example, a single layer elastic film was produced by dry blending 69% VECTOR 4111 (SIS) with 29% VECTOR 4411 (SIS) and 2% of whitening compound (containing 50% titanium dioxide with 50% polyethylene). The formulation was cast into a film (80 gsm) and then made into an elastic laminate in the same manner as described in the previous example. The newly formed elastic laminate produced had appreciable elastic properties. For example, under the same testing, as described in the previous example, the film/nonwoven laminate demonstrated a hysteresis of 55.5 percent and a set of 4.3 percent.

In one alternative embodiment, elastic film laminates (such as ultrasonically bonded laminates) produced via the inventive materials demonstrate a first cycle hysteresis value of less than about 70 percent. In a further alternative embodiment, the elastic film laminates demonstrate a hysteresis value of less than about 60 percent. In still a further alternative embodiment, the elastic film laminates demonstrates a hysteresis value of less than about 50 percent.

In another alternative embodiment, an elastic film laminate produced via the inventive materials demonstrates a set of less than about 25 percent. In a further alternative embodiment, the elastic film laminate demonstrates a set of less than about 15 percent. In still a further alternative embodiment, the elastic film laminate demonstrates a set of less than about 10 percent. Graphs of the testing results for the immediately preceding examples are illustrated in FIGS. 9 and 10, which show stress strain cycle data for single layer SIS/SBS film/laminates with films having basis weights of 80 gsm.

In still a further example, a non-blocking multi-layered elastic film, as generally illustrated in FIG. 5B as 50, and having an ABA cross-sectional structure was produced. The film had skin layers (A) of 3% on each surface by weight of total film basis weight. The skin layers consisted of anti-blocking compound of 20% SUPERFLOSS diatomaceous earth (or DE) from the Celite Corporation, blended with 80% AFFINITY PT1450 polyethylene of Dow. The core layer (B) comprised 94% by weight of the entire film and was produced by dry blending 27% VECTOR 4111 (SIS) with 70% VECTOR 4411 (SIS) and 3% of whitening compound (containing 50% titanium dioxide with 50% polyethylene). The elastic core formulation was dry blended in a rotary mixer and processed through a first single screw extruder, while the skin layer material was delivered from a second single screw extruder. Both polymer streams described above passed through a Zenith gear metering pump (Parker Zenith Pumps; Parker Hannifin; Sanford, N.C. Model 60-20000-1877-4) before being combined and cast into a multilayer film via a mixing block and coat hanger style film die (14" wide Randcastle). The first extruder, used to deliver the skin layer material had processing temperatures for the last extruder temperature zone and hose of approximately 345-350° F., and a inlet and discharge hose set at 380° F. just prior to the mixing block. The second extruder, used to deliver elastic core layer material, had processing temperatures for the last extruder temperature zone and hose of approximately 415-420° F., and an inlet and discharge hose set at 410° F. just prior to the mixing block. The mid-block temperatures ranged from about 410° F. before and 360° F. after the mixing block and multilayered die temperatures ranged from about 360-370° F. The film was cast onto a chilled TEFLON (PTFE) coated roll at 14 feet per minute (fpm) and then passed over series of idler rolls at minimal film stretch and wound up. The film produced had appreciable elastic properties having a measured basis weight of 41 gsm. The film was also capable of being unwound without blocking (that is sticking to itself).

In still a further example, another non-blocking multi-layered elastic film having an ABA cross-structure was produced having skin layers (A) of 3% on each surface by weight of total film basis weight. The skin consisted of anti-blocking compound comprising 20% SUPERFLOSS DE from the Celite Corporation, blended with 80% AFFINITY PT1450 polyethylene of Dow. The core layer (B) consisting of 94% by weight of the entire film and was produced by dry blending 20% Vector 4111 (SIS) with 70% Vector 4411 (SIS), with 7% ELVAX 240 (EVA) of DuPont and 3% of a whitening compound (containing 50% titanium dioxide with 50% polyethylene). The skin and elastic core formulations were cast into a multilayered film in the same manner and conditions as described in the previous example. The film produced had appreciable elastic properties having a measured basis weight of 37 gsm and was capable of being unwound without blocking.

In still further examples, further film formulations were evaluated to determine the performance of various high melt flow rate homopolymers and copolymers. The films generally demonstrated better formation and evenness, the absence of holes and little to no edge tearing. For example, the addition of SEPS (Septon S-2002) having a melt flow rate of 45 into an SIS formulation produced more uniform film construction than just SIS films. Additionally, the addition of ELVAX 350 having a melt flow rate of 19 with SEPS in an SIS formulation also produced similar results. Similar results were further obtained with the addition of ELVAX 240 with a SEPS in an SIS film formulation.

As a result of the various evaluations, it was determined that the blending of SIS with SBS in specific ratios, as well as the incorporation of other polymers/compatibilizers into SIS formulations made the resulting film formulation less sensitive to temperature variation during the film extrusion process. Such blending also, depending on the embodiment, assisted in maintaining viscosity levels.

It should be recognized that such film formulations may be made through an in-line manufacturing process or in an off-line process, and then either stored for later use and introduced off of a roll or immediately introduced into an in-line product manufacturing process. Similarly, a filament-based material made with the inventive formulations can be introduced via an in-line process and immediately provided, or from an off-line process and provided from a storage roll.

Example of Specific Use of Films/Filament Materials and Laminates in Personal Care Product Applications:

Such blended materials have particular effectiveness for use in personal care products to provide elastic attributes to such products. For instance, such material may be useful in providing elastic waist, leg cuff/gasketing, stretchable ear, side panel or stretchable outer cover applications. Such polymeric material may be useful as the base film and filament materials for necked bonded laminate, stretch bonded laminate and neck stretch bonded laminate materials. While not meant to be limiting, FIG. 8 is presented to illustrate various components of a personal care product, such as a diaper, that may take advantage of such blended elastic composition materials. Other examples of personal care products that may incorporate such materials are training pants, and feminine care products.

With reference to FIG. 8, the disposable diaper 130 generally defines a front waist section 132, a rear waist section 134, and an intermediate section 136 which interconnects the front and rear waist sections. The front and rear waist sections 132 and 134 include the general portions of the diaper which are constructed to extend substantially over the wearer's front and rear abdominal regions, respectively, during use. The intermediate section 136 of the diaper includes the general portion of the diaper that is constructed to extend through the wearer's crotch region between the legs. Thus, the intermediate section 136 is an area where repeated liquid surges typically occur in the diaper.

The diaper 130 includes, without limitation, an outer cover, or backsheet 138, a liquid permeable bodyside liner, or topsheet, 140 positioned in facing relation with the backsheet 138, and an absorbent core body, or liquid retention structure, 154, such as an absorbent pad, which is located between the backsheet 138 and the topsheet 140. The backsheet 138 defines a length, or longitudinal direction 150, and a width, or lateral direction 152 which, in the illustrated embodiment, coincide with the length and width of the diaper 130. The liquid retention structure 154 generally has a length and width that are less than the length and width of the backsheet 138, respectively. Thus, marginal portions of the diaper 130, such as marginal sections of the backsheet 138, may extend past the terminal edges of the liquid retention structure 154. In the illustrated embodiments, for example, the backsheet 138 extends outwardly beyond the terminal marginal edges of the liquid retention structure 154 to form side margins and end margins of the diaper 130. The topsheet 140 is generally coextensive with the backsheet 138 but may optionally cover an area which is larger or smaller than the area of the backsheet 138, as desired.

To provide improved fit and to help reduce leakage of body exudates from the diaper 130, the diaper side margins and end margins may be elasticized with suitable elastic members, as further explained below. For example, as representatively illustrated in FIG. 8, the diaper 130 may include leg elastics 156 which are constructed to operably tension the side margins of the diaper 130 to provide elasticized leg bands which can closely fit around the legs of the wearer to reduce leakage and provide improved comfort and appearance. Waist elastics 158 are employed to elasticize the end margins of the diaper 130 to provide elasticized waistbands. The waist elastics 158 are configured to provide a resilient, comfortably close fit around the waist of the wearer.

The films, film laminates and filament laminates of the inventive compositions are suitable for use as the leg elastics 156 and waist elastics 158. Exemplary of such materials are sheets, strands or ribbons of the inventive elastomeric material which are adhered to the backsheet, such that elastic constrictive forces are imparted to the backsheet 138.

As is known, fastening means, such as hook and loop fasteners, may be employed to secure the diaper 130 on a wearer. Alternatively, other fastening means, such as buttons, pins, snaps, adhesive tape fasteners, cohesives, fabric-and-loop fasteners, or the like, may be employed. In the illustrated embodiment, the diaper 130 includes a pair of side panels 160 (or ears) to which the fasteners 162, indicated as the hook portion of a hook and loop fastener, are attached. Generally, the side panels 160 are attached to the side edges of the diaper 130 in one of the waist sections 132, 134 and extend laterally outward therefrom. The side panels 160 may be elasticized or otherwise rendered elastomeric by use of film, film laminate or filament laminate made from the inventive compositions. For example, the side panels 160, or indeed, any precursor webs of the garment, may be an elastomeric material such as, e.g., a neck-bonded laminate or stretch-bonded laminate material made with the inventive composition material as the elastic layer of the respective laminates. Methods of making such materials are well known to those skilled in the art and are described in U.S. Pat. No. 4,663,220 to Wisneski et al., U.S. Pat. No. 5,226,992 to Morman, and European Patent Application No. EP 0 217 032 in the names of Taylor et al. Examples of absorbent articles that include elasticized side panels and selectively configured fastener tabs are described in PCT Patent Application No. WO 95/16425 to Roessler; U.S. Pat. No. 5,399,219 to Roessler et al.; U.S. Pat. No. 5,540,796 to Fries; and U.S. Pat. No. 5,595,618 to Fries each of which is hereby incorporated by reference in its entirety.

The diaper 130 may also include a surge management layer 142, located between the topsheet 140 and the liquid retention structure, to rapidly accept fluid exudates and distribute the fluid exudates to the liquid retention structure 154 within the diaper 130. The diaper 130 may further include a ventilation layer (not illustrated), also called a spacer, or spacer layer, located between the liquid retention structure 154 and the backsheet 138, to insulate the backsheet 138 from the liquid retention structure 154 to reduce the dampness of the garment at the exterior surface of a breathable outer cover, or backsheet, 138. Examples of suitable surge management layers 142 are described in U.S. Pat. No. 5,486,166 to Bishop and U.S. Pat. No. 5,490,846 to Ellis.

As representatively illustrated in FIG. 8, the disposable diaper 130 may also include a pair of containment flaps 164 which are configured to provide a barrier to the lateral flow of body exudates. The containment flaps 164 may be located along the laterally opposed side edges of the diaper 130 adjacent the side edges of the liquid retention structure 154. Each containment flap 164 typically defines an unattached edge which is configured to maintain an upright, perpendicular configuration in at least the intermediate section 136 of the diaper 130, to form a seal against the wearer's body. The containment flaps 164 may extend longitudinally along the entire length of the liquid retention structure 154 or may only extend partially along the length of the liquid retention structure. When the containment flaps 164 are shorter in length than the liquid retention structure 154, the containment flaps 164 can be selectively positioned anywhere along the side edges of the diaper 130 in the intermediate section 136. Such containment flaps 164 are generally well known to those skilled in the art. For example, suitable constructions and arrangements for containment flaps 164 are described in U.S. Pat. No. 4,704,116 to K. Enloe, incorporated by reference herein in its entirety.

The diaper 130 may be of various suitable shapes. For example, the diaper may have an overall rectangular shape, T-shape or an approximately hour-glass shape. In the shown embodiment, the diaper 130 has a generally I-shape. Other suitable components which may be incorporated on absorbent articles of the present invention may include waist flaps and the like which are generally known to those skilled in the art. Examples of diaper configurations suitable for use in connection with the instant invention which may include other components suitable for use on diapers are described in U.S. Pat. No. 4,798,603 to Meyer et al.; U.S. Pat. No. 5,176,668 to Bernardin; U.S. Pat. No. 5,176,672 to Bruemmer et al.; U.S. Pat. No. 5,192,606 to Proxmire et al. and U.S. Pat. No. 5,509,915 to Hanson et al. each of which is hereby incorporated by reference herein in its entirety.

The various components of the diaper 130 are assembled together employing various types of suitable attachment means, such as adhesive, ultrasonic bonds, thermal bonds or combinations thereof. In the shown embodiment, for example, the topsheet 140 and backsheet 138 may be assembled to each other and to the liquid retention structure 154 with lines of adhesive, such as a hot melt, pressure-sensitive adhesive. Similarly, other diaper components, such as the elastic members 156 and 158, fastening members 162, and surge layer 142 may be assembled into the article by employing the above-identified attachment mechanisms.

In a further alternative embodiment, such inventive compositions may be particularly useful as an ear attachment (as previously described) for a diaper or other personal care product. By utilizing the blend compositions of the present invention, film physical properties may be altered, as well as the processing conditions, such that a blended film of two or more SIS block copolymers can be made which demonstrate improved strength at lower basis weight. For example, VECTOR 4111 (70-80 weight percent) was dry blended with VECTOR 4411 (melt flow rate of 40). The film made from the blend demonstrated strength and provided high tension at low basis weights. The process conditions for extruding the film included extruder temperatures of between about 264-395° F.; hose temperatures of between about 395-410° F., and die temperatures of between about 340 and 368° F. The melt pump pressure was about 530 psi and the screw speed was about 17-18 rpm. Films of this formulation were made at 60, 90 and 120 gsm.

In still a further alternative embodiment of a material utilizing a blended composition for use in a personal care product application, a film laminate of the inventive composition but also including a corrugated surface structure, may be utilized as an effective ear attachment for a diaper. An elastic film laminate with a corrugated surface structure was created by ultrasonic point bonding and then immediately following bonding with a stretching step in the cross-machine direction (as part of a neck bonded laminate). It has been found that the corrugated nonwoven facing structure makes the laminate aesthetically attractive, softer and bulkier, as well as imparts greater stretch to the material. Such materials may consequently have other uses such as in industrial wipes or filter-type product applications, where such attributes are desirable. Such laminates demonstrate greater surface topography than traditional adhesively or thermally bonded laminates, which often have flat surfaces with limited stretch.

As with previous examples, an elastic film was made from a blended composition of SIS or SBS unsaturated styrenic block copolymers. The films were then laminated between two 56 percent necked polypropylene spunbond facing layers. The elastic film was based on a dry blend of 69 percent VECTOR 4111 (MFR 12), 29 percent VECTOR 4411 (MFR 40) or VECTOR 4461 (MFR 23), 2 percent whitening agent (50 percent titanium dioxide in polyethylene). The film produced (2 inch wide sample) provided high tension of between about 400 and 500 grams at 100 percent elongation, and at a low basis weight of between about 70-80 gsm. The film was sandwiched between two of the necked spunbond facing materials with 0.75 osy basis weight each, without stretching. The materials were wound in a roll. The sandwiched laminate was then unwound and bonded using a Herrmann rotary ultrasonic point bonder without further stretching of the film and facings. The following bonder and conditions were employed: A Herrmann 2000CS Ultrasonic Generator with 2000 W at 20 kHz and 240 VAC at single phase was employed. The converter was a 20/4000 SIP 65, 20 kHz. The converter actuator was a Schober VE20CS UE-ST, 96204312-12 with operator incremental position step being 0.0005 inch. The stepper motor was a VRDM 3910/50 LWC, 52426.0352.00, I=2.0 A, Mn=4.0 Nm, P=50, VDE 0530. The PLC Controller was a Berger-Lahr WDP 3-314.08 RS.08, Typ. S6030-0048.00, Erz. No. 77030004800. The drive controller was a Fenner M-Trim, with a web speed 50-100 FPM. The pattern roll was a 155 mm diameter roll. The nip roll ahead of the ultrasonic horn had less than 10 psi air on the cylinders.

Following lamination, the material initially appeared flat. However, when such material was stretched until stop in the CD direction (until the facing stopped the stretch), and then subsequently released, the film returned to approximately its original dimensions but a significantly corrugated surface structure was immediately produced in the nonwoven facing layers. If even higher surface corrugations are desired, such film can be prestretched in the MD direction prior to being bonded with the facings. Such bonding technique increased the thickness of the laminate over known adhesive and thermal boding techniques by approximately four times, leading to a high bulk laminate product.

It should be appreciated that such composition materials may likewise be used in other personal care products, protective outerwear, protective coverings and the like. Use of such materials provide acceptable elastic performance at a lower manufacturing cost. Furthermore, use of such inventive compositions allows for extrusion of unsaturated block copolymers into film or filaments without risking manufacturing problems and product performance issues.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A nonwoven composite, comprising:
    a non-woven material;
    an extruded film layer adhered to said non-woven material, said film layer prepared from a blended composition comprising
    a) an unsaturated styrene-isoprene-styrene block copolymer having a melt flow rate of less than 20 g/10 min.,
    b) a compatibilizer including a styrene-butadiene-styrene block copolymer, wherein said compatibilizer has a melt flow rate of about 20 g/10 min. or more; and
    wherein said styrene-isoprene-styrene and styrene-butadiene-styrene block copolymers are present is said blended composition in a ratio of from about 1.5:1 to about 2.5:1.

2. The composite of claim 1, wherein said compatibilizer has a melt flow rate of about 30 g/10 min. or more.

3. The composite of claim 1, wherein said compatibilizer has a melt flow rate of about 40 g/10 min. or more.

4. The composite of claim 1 wherein said compatibilizer has a melt flow rate of from about 20 g/10 min. to about 50 g/10 min.

5. The composite of claim 1, wherein said unsaturated styrene-isoprene-styrene block copolymer and said compatibilizer are present in a ratio from about 95:5 to about 80:20.

6. The composite of claim 1, wherein said styrene-isoprene-styrene and styrene-butadiene-styrene are present in said blended composition in a ratio of from 1.5:1 to 2.5:1.

7. The composite of claim 1, wherein said compatibilizer has a styrene content by weight of at least about ten percent.

8. The composite of claim 1, wherein said compatibilizer has a styrene content by weight of at least about twenty percent.

9. The composite of claim 1, wherein said compatibilizer has a styrene content by weight of at least about thirty percent.

10. The composite of claim 1, wherein said compatibilizer has a styrene content by weight of at least forty percent.

11. The composite of claim 1, wherein said nonwoven material comprises a necked, spunbond material.

12. The composite of claim 1, wherein said nonwoven material comprises a corrugated, spunbond material.

13. The composite of claim 1, wherein said nonwoven material comprises a meltblown material.

14. The composite of claim 1, wherein said composite has a first cycle hysteresis value of less than about 70 percent.

15. The composite of claim 1, wherein said blended composition further comprises a polyolefinic polymer.

16. The composite of claim 15, wherein said unsaturated styrene-isoprene-styrene block copolymer and said compatibilizer are present with said polyolefinic polymer in a ratio from about 20:80 to about 40:60 unsaturated styrene-isoprene-styrene block copolymer and compatibilizer to polyolefinic polymer.

17. The composite of claim 15 wherein said unsaturated styrene-isoprene-styrene block copolymer and said compatibilizer are present with said polyolefinic polymer in a ratio from about 95:5 to about 80:20 unsaturated styrene-isoprene-styrene block copolymer and compatibilizer to polyolefinic polymer.

* * * * *